(12) United States Patent
Wangikar

(10) Patent No.: US 11,226,801 B2
(45) Date of Patent: Jan. 18, 2022

(54) SYSTEM AND METHODS FOR VOICE CONTROLLED AUTOMATED COMPUTER CODE DEPLOYMENT

(71) Applicant: MASTERCARD INTERNATIONAL INCORPORATED, Purchase, NY (US)

(72) Inventor: Devendra Dilip Wangikar, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/669,040

(22) Filed: Oct. 30, 2019

(65) Prior Publication Data
US 2021/0132926 A1 May 6, 2021

(51) Int. Cl.
*G06F 8/60* (2018.01)
*G06N 20/00* (2019.01)
(Continued)

(52) U.S. Cl.
CPC ............... *G06F 8/60* (2013.01); *G06N 5/003* (2013.01); *G06N 5/04* (2013.01); *G06N 20/00* (2019.01); *G10L 15/22* (2013.01); *G10L 15/30* (2013.01); *H04L 67/20* (2013.01); *H04L 67/42* (2013.01); *G10L 2015/223* (2013.01)

(58) Field of Classification Search
CPC .... G06F 3/167; G06F 3/0482; G06F 16/3329; G06F 9/451; G06F 8/60; G06F 8/70; G06F 8/20; G06F 9/44; G06F 9/445; H04L 67/10; H04L 67/327; H04L 67/20; H04L 67/42; H04L 41/0668; H04L 41/0803; H04L 41/0816; H04L 43/0882; H04L 43/16; H04L 45/70; H04L 67/303; H04L 43/08; H04L 43/0811; G06N 20/00; G06N 3/02;
(Continued)

(56) References Cited

U.S. PATENT DOCUMENTS 8,225,281 B1 7/2012 Hardinger et al.
10,423,709 B1 9/2019 Bradley et al.
(Continued)

OTHER PUBLICATIONS

"Voice Control Your Jenkins", Doru Muntean, Netcentric, Jun. 5, 2017. https://www.netcentric.biz/insights/2017/06/voice-control-your-jenkins.html.

*Primary Examiner* — Tonia L Dollinger
*Assistant Examiner* — Linh T. Nguyen
(74) *Attorney, Agent, or Firm* — Armstrong Teasdale LLP

(57) ABSTRACT

An automated deployment computer system for deploying code to a server is provided herein. The automated deployment computer system includes at least one processor in communication with at least one memory device. The processor is configured to: receive a voice input from a user computing device, wherein the voice input includes at least one user command, wherein the user command contains user instructions for deploying code to a first server; extract the user command from the voice input; generate deployment instructions based on the user command, wherein the deployment instructions are computer-executable instructions for causing the deployment of the code on the first server; and transmit the deployment instructions to an automation server.

17 Claims, 10 Drawing Sheets

(51) Int. Cl.
*G06N 5/00* (2006.01)
*G06N 5/04* (2006.01)
*H04L 29/06* (2006.01)
*G10L 15/30* (2013.01)
*G10L 15/22* (2006.01)
*H04L 29/08* (2006.01)

(58) Field of Classification Search
CPC . G06N 3/08; G06N 5/003; G06N 5/04; G10L 15/22; G10L 15/30
See application file for complete search history.

(56) References Cited

U.S. PATENT DOCUMENTS

| | | | | |
|---|---|---|---|---|
| 2011/0295922 | A1* | 12/2011 | Vecera | G06F 9/546 709/201 |
| 2013/0346268 | A1* | 12/2013 | Pereira | G06F 8/65 705/34 |
| 2014/0189641 | A1 | 7/2014 | Anderson et al. | |
| 2015/0088523 | A1 | 3/2015 | Schuster | |
| 2016/0098996 | A1* | 4/2016 | Ding | G10L 15/22 704/232 |
| 2017/0187787 | A1* | 6/2017 | Syamala | H04L 67/1002 |
| 2017/0236060 | A1* | 8/2017 | Ignatyev | G06N 20/00 706/46 |
| 2018/0122375 | A1* | 5/2018 | Nishikawa | G06F 3/167 |
| 2018/0167490 | A1 | 6/2018 | Morton et al. | |
| 2019/0080235 | A1* | 3/2019 | Maruhashi | G06N 3/08 |
| 2019/0138280 | A1* | 5/2019 | Ma | G06F 8/60 |
| 2019/0138299 | A1* | 5/2019 | Ma | G06F 8/34 |
| 2019/0180750 | A1 | 6/2019 | Renard et al. | |
| 2019/0199845 | A1* | 6/2019 | Choi | G10L 15/22 |
| 2019/0332369 | A1* | 10/2019 | Gupta | G06F 8/65 |
| 2020/0014607 | A1* | 1/2020 | Gangadhar | H04L 41/16 |
| 2020/0043502 | A1* | 2/2020 | Ding | G10L 17/00 |
| 2020/0051555 | A1* | 2/2020 | Jaygarl | G10L 15/30 |

* cited by examiner

US 11,226,801 B2

SYSTEM AND METHODS FOR VOICE CONTROLLED AUTOMATED COMPUTER CODE DEPLOYMENT

BACKGROUND

The present disclosure relates generally to computer code deployment and, more particularly, to systems and methods for automating the deployment of computer code.

Known computer systems generally rely on manual deployment of computer code in order to update and/or alter computer software. Software development may involve the integration, delivery, and/or deployment of computer code, all of which may be implemented manually by a developer. For example, a developer may initiate computer code integration to compile computer code changes made by multiple developers and test whether the computer code is functional. In some software development systems, a developer may utilize an automation server as a hub for more easily managing computer code changes.

However, current systems for managing software development, whether or not they include an automation server, may be limited by a reliance on manual input from developers for effectively implementing computer code changes. For example, a programmer or an automation server may attempt to deploy computer code on a server that has been de-activated, in which case the computer code deployment may have to be manually completed. In another example, deployed software may experience an error running on a certain server, and the error may require manual resolution. Such manual interventions may inhibit computer systems in a number of ways. For example, too many code updates may be received within a given period of time for the updates to be reliably deployed manually in a timely manner, thus hindering efficient development and evolution of a computer system. Additionally, manual interventions increase the chance of introducing human error into a computer system, potentially leading to additional errors and bugs in the code. Further, manual code deployments may decrease a computer system's security, but increase the system's reliance on external outputs.

Accordingly, a system is needed that (i) allows for a user to easily interact with a computer code deployment system, (ii) automates computer code deployment in the face of potential errors, and (iii) learns to more effectively interact with particular users.

BRIEF DESCRIPTION

The present embodiments may relate to systems and methods for automated computer code deployment. The system may include an automated deployment ("AD") computing device, a user computing device, an automation server, deployment servers, a third party applications server, and an automation database.

In one aspect, an automated deployment computer system for deploying code to a server is provided. The automated deployment computer system includes at least one processor in communication with at least one memory device. The processor is configured to: (i) receive a voice input from a user computing device, wherein the voice input includes at least one user command, wherein the user command contains user instructions for deploying code to a first server; (ii) extract the user command from the voice input; (iii) generate deployment instructions based on the user command, wherein the deployment instructions are computer-executable instructions for causing the deployment of the code on the first server; and (iv) transmit the deployment instructions to an automation server.

In another aspect, a computer-implemented method for deploying code to a server is provided. The method is implemented by a computer system including at least one processor. The method comprises: (i) receiving a voice input from a user computing device, wherein the voice input includes at least one user command, wherein the user command contains user instructions for deploying code to a first server; (ii) extracting the user command from the voice input; (iii) generating deployment instructions based on the user command, wherein the deployment instructions are computer-executable instructions for causing the deployment of the code on the first server; and (iv) transmitting the deployment instructions to an automation server.

In another aspect, at least one non-transitory computer-readable storage media having computer-executable instructions embodied thereon for deploying code to a server is provided. When executed by at least one processor, the computer-executable instructions cause the processor to: (i) receive a voice input from a user computing device, wherein the voice input includes at least one user command, wherein the user command contains user instructions for deploying code to a first server; (ii) extract the user command from the voice input; (iii) generate deployment instructions based on the user command, wherein the deployment instructions are computer-executable instructions for causing the deployment of the code on the first server; and (iv) transmit the deployment instructions to an automation server.

BRIEF DESCRIPTION OF THE DRAWINGS

FIG. 1 illustrates a block diagram of an automated deployment ("AD") computer system including an automated deployment ("AD") computing device.

FIG. 2 illustrates a data flow within the AD computer system of FIG. 1.

FIG. 3 illustrates a data flow between modules of the AD computing device of FIG. 1.

FIG. 4 illustrates a data flow within a machine learning module of the AD computing device of FIG. 1.

FIG. 5 illustrates a data flow within a language module of the AD computing device of FIG. 1.

FIG. 6 illustrates a data flow within an instructions module of the AD computing device of FIG. 1.

FIG. 7 illustrates a schematic diagram of an exemplary user computing device, such as a user computing device that may be included in the AD computing system of FIG. 1.

FIG. 8 illustrates a schematic diagram of a server computing device, such as the AD computing device of FIG. 1.

FIG. 9 illustrates a flow chart of a method for automatically deploying code using an AD computing device, such as the AD computing device of FIG. 1.

FIG. 10 illustrates a diagram of a computer device and internal components, such as those that may be found in the AD computing device of FIG. 1.

DETAILED DESCRIPTION OF THE DISCLOSURE

Figure 1:
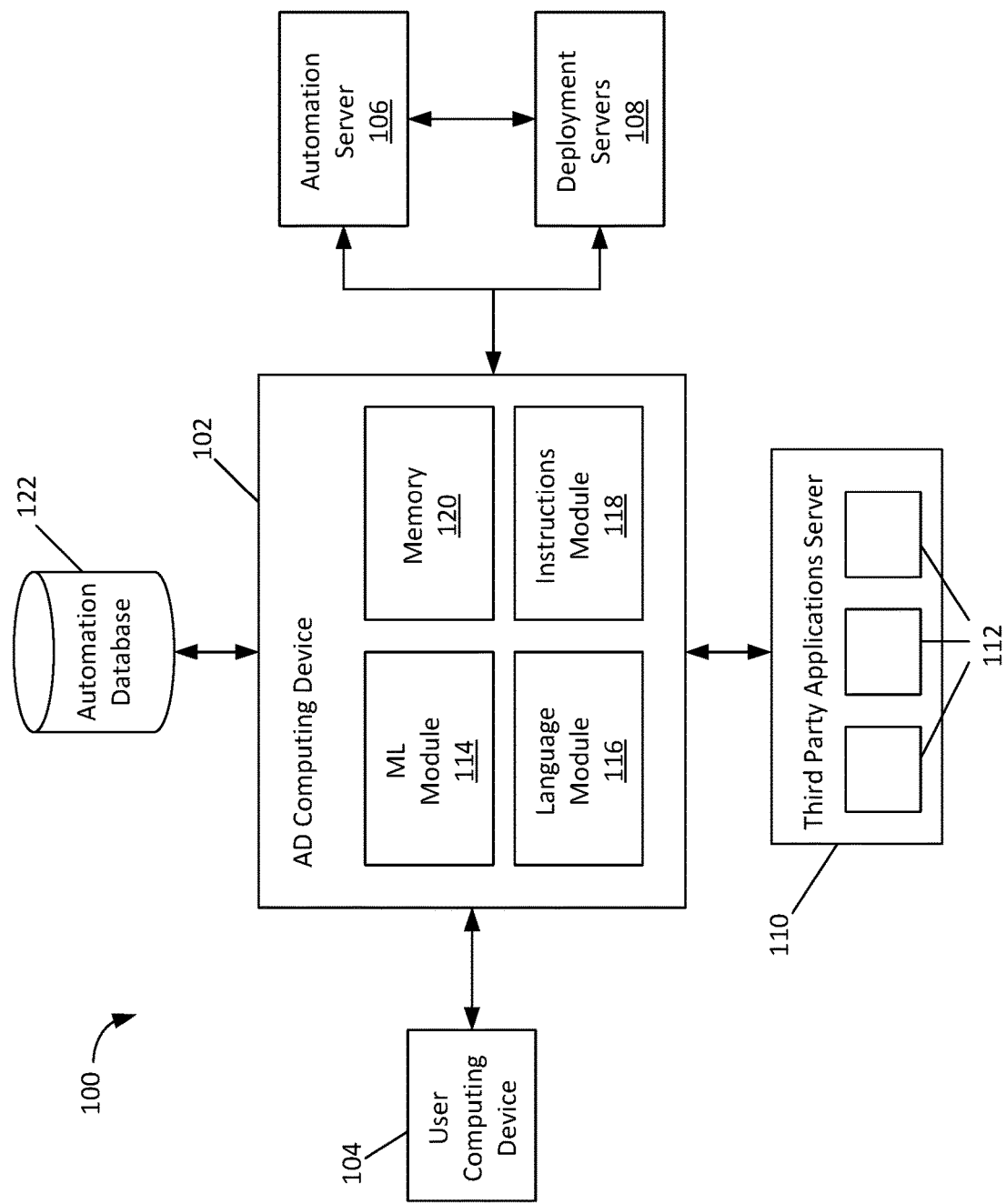
FIGS. 1-10 show example embodiments, of the methods and systems described herein.

Embodiments of the present disclosure relate generally to automated computer code deployment. More particularly, the present disclosure relates to a computer system, referred to herein as an automated deployment ("AD") computer system, that enables voice-activated computer code deployment and utilizes machine learning to address errors encountered during computer code deployment. The AD computer system may receive a voice command from a user, determine the voice command contains a user request to deploy certain computer code, attempt to deploy the computer code, and automatically employ alternate strategies for deployment in the case of encountering an error. Based on historical deployment data and user-specific actions, the AD computer system may automatically adapt over time to more effectively handle errors or unexpected scenarios in a way desirable for a particular user or group of users.

As used herein, "software" or "computer code" or simply "code" refers to any piece of software, software application, computer program, computer application, computer code, fragment or fragments of computer code, a snippet or snippets of code, and/or any computer-executable instructions that may be implemented by a computer processor. In particular, the software may be "deployed" on a computer server or computer processor. As used herein, "deploy" refers to a general process including any of a number of activities related to implementing and running software on a computer server. These activities may include but are not limited to integration, release, installation, activation, and/or configuring or creating virtual machines.

The methods and systems described herein are implemented using the automated deployment ("AD") computer system that includes at least an automated deployment ("AD") computing device in communication with a deployment server. The deployment server is any server capable of receiving and running software. The AD computing device includes one or more processors and a memory, which may include a centralized or non-centralized database. The AD computing device is configured to deploy software on the deployment server and further configured to communicate with the deployment server, for example, to check the health of the deployment server or the status of deployed software.

In an exemplary embodiment, the AD computer system may further include a user computing device, an automation server, a third party applications server, and an automation database, all of which are in communication with the AD computing device. The user computing device is a computing device, such as a virtual assistant or smart home device, that is configured to transmit user input to the AD computing device and receive output data sent from the AD computing device. The automation server is any application or server that enables the manipulation of objects implemented in another application, in this case enabling the deployment of software on a given server. The automation server is configured to communicate with and manage the deployment server and in some embodiments, act as an intermediary between the AD computing device and the deployment server. The third party applications server is configured to receive instructions from the AD computing device for communicating with a plurality of third party applications. The automation database is configured to store data from external sources for use by the AD computing device and/or to store data sent from the AD computing device.

As used herein, "virtual assistant" or "smart home device" refer to any virtual assistant, chatbot, smart home device, voice controlled computing device, and/or voice service including, but not limited to, AMAZON ECHO, ALEXA, CORTANA, GOOGLE HOME, and SIRI. As used herein, "automation server" refers to any application or server that enables the manipulation of objects implemented in another application, and may include, but is not limited to, software such as JENKINS and BAMBOO. Further, as used herein, "third party applications" refer to any additional software or applications in communication with the AD computing device and/or automation server, including, but not limited to, messaging applications such as SLACK, JABBER, SKYPE, or OUTLOOK, and other applications such as STACKOVERFLOW or GITHUB.

In the exemplary embodiment, the AD computing device receives a voice input from the user computing device. The voice input may include, for example, a user-instruction to deploy software A on server B. Specifically, the user may speak the phrase "Deploy A on B" into a user computing device, such as a virtual assistant or smart home device, and an audio file for "Deploy A on B" is received by the AD computing device. The AD computing device is configured to interpret the voice input by converting it to text and assigning meaning to the text. In the current example, the AD computing device may convert the audio of "Deploy A on B" into text, process the text using a machine learning model, and determine that the user is requesting the deployment of software A on server B. The AD computing device may then generate computer-executable instructions for carrying out the user-instruction and transmit the instructions to the deployment server or the automation server. In the above example, the AD computing device may generate instructions which cause the automation server to deploy software A on server B. Additionally, the AD computing device is configured to generate instructions for carrying out a task on a third party application and transmit the instructions to a third party applications server. In one example, the AD computing device may generate instructions which cause the third party applications server to send a message over a third party application any time a deployment request is made.

In the exemplary embodiment, the AD computing device is further configured to receive a response from the automation server, deployment server, and/or third party applications server, and take further action based on the response. The AD computing device is further configured to generate a notification asking for user input to the user computing device, and transmit the notification to the user computing device. The AD computing device receives a user-response from the user computing device, and generates and transmits a revised instruction based on the user-response. In one example, the AD computing device receives an error message from the automation server indicating that the specified server, server B, is offline. The AD computing device may generate and transmit a message asking how the user would like to proceed, and receives a response from the user indicating that the user would like the software deployed on server C instead of server B. The AD computing device may then generate and transmit instructions to the automation server that cause the automation server to deploy code A on server C. In the exemplary embodiment, the AD computing device is configured to generate notifications for users, receive user input, and generate revised instructions in response to receiving a response from the third party application server as well.

In the exemplary embodiment, the AD computing device is further configured to generate computer-executable instructions, such as deployment instructions and revised instructions, using machine learning models. In one embodiment, the AD computing device determines the text input and meaning for a voice input, and the AD computing device determines specific computer-executable instructions for implementing the voice input based on a machine learning model. In another embodiment, the AD computer device receives a response from the automation server, deployment server, and/or third party applications server, and determines what action to take based on a machine learning model. In another embodiment, the AD computer device utilizes user-responses, such as a command to deploy to server C when server B is offline, to more effectively respond to subsequent error messages received from the application server, deployment server, and/or third party applications server. For example, the AD computer device may generate instructions based on a machine learning model that has been trained from historical data. The AD computer device may further receive an error message from an automation server and, using a machine learning model, determine that a notification should be sent to the user asking for input. After receiving the user-input, the AD computing device may update one or more machine learning models in order to incorporate the user's response, thereby creating a machine learning model customized to the user and more able to handle subsequent errors.

In the exemplary embodiment, the AD computing device receives a voice input from the user computing device. The AD computing device further receives machine learning ("ML") data, language data, and system data from the automation database. Based on the voice input, ML data, language data, and system data, the AD computing device generates deployment instructions for deploying software on the deployment server and transmits the deployment instructions to the automation server. The AD computing device receives application response data from the automation server, and based on the application response data, ML data, and system data, generates revised instructions and transmits the revised instructions to the automation server. In some embodiments, the AD computing device also generates third party application instructions based on the voice input, ML data, language data, system data, and/or application response data, and transmits the third party application instructions to the third party applications server. The AD computing device additionally receives application response data from the third party applications server. In alternative embodiments, the AD computing device carries out at least one of generating deployment instructions, transmitting deployment instructions, generating revised instructions, and transmitting revised instructions with or without further interaction from a user.

In the exemplary embodiment, the AD computing device receives a voice input from the user computing device. The voice input may be a voice command spoken by a user and captured by the user computing device. In some embodiments, the voice input is a voice command spoken to a virtual assistant, chatbot, or smart home device. In other embodiments, the voice input is a voice command simply spoken into the user computing device. In alternative embodiments, the voice input is pre-recorded or computer generated. In the exemplary embodiment, the voice input contains a user-command and a wake word. The wake word refers to a word, phrase, expression, sound, or any other type of audio input meant to activate the functions of a user computing device. For example, a user inputting a voice input using a virtual assistant may start their voice input with the wake word "Virtual Assistant X", which causes the user computing device to begin receiving the voice input.

The user-command refers to an expression of an outcome desired by the user. The user-command may contain a specified application, a user-instruction, and/or a specified server. The user-instruction refers to a computer implemented action or outcome desired by the user. The specified application refers to a software program or application specified by the user for carrying out the user-instruction. The specified server refers to a server location that may be relevant to the user-instruction. For example, a voice input may contain a user-command with a user-instruction to deploy a particular piece of software on a specified server and for the deployment to be carried out by a specific application. In some embodiments, the user-command does not include at least one of a user-instruction, specified application, and/or specified server, and the AD computing device is configured to utilize a machine learning model to determine any missing components. In some embodiments, the user-command includes only a user-instruction and does not include a specified application or specified server. For example, a user may speak the words "Virtual Assistant X, deploy software A on server B", and a user computing device may capture the spoken words as a voice input which contains a wake word ("Virtual Assistant X") a user-instruction ("deploy software A") and a specified server ("server B"). As another example, a user may speak the words "Tell Application Y to deploy software C", and a user computing device may capture the spoken words as a voice input which contains a specified application ("Application Y") and a user-instruction ("deploy software C").

In some embodiments, specified applications, user-instructions, and/or specified servers may be preceded by an identifier (e.g., "application X" or "server Y" or "software Z"). In other embodiments, user-commands may contain no identifiers for the specified applications, user-instructions, and/or specified servers, and the AD computer device is able to determine the elements of the user-command by analyzing the voice input. For example, a user may speak the user-command "Deploy A on B" and the AD computing device may determine that the user-instructions are to deploy software A on the specified-server server B. In some embodiments, a voice input may contain a mix of elements with identifiers and elements without identifiers, and the AD computing device is able to effectively interpret the voice input. In the exemplary embodiment, the AD computing device employs machine learning models to more effectively interpret and implement voice inputs. In one embodiment, the AD computing device is configured to respond to voice inputs by asking for clarification. In other words, based on a voice input, the AD computing device may determine that more information is required to properly process the voice input, and the AD computing device may generate and transmit an output asking a user to clarify the voice input. In some embodiments, the AD computing device requests user clarification for specific elements of the voice input, while in other embodiments, the AD computing device may simply request that the user repeat the voice input.

In the exemplary embodiment the AD computing device further receives ML data, language data, and system data from the automation database. ML data may include calibrated or uncalibrated machine learning ("ML") models, training data, function elements, and/or machine learning ("ML) methods and algorithms. ML models, which can be calibrated or uncalibrated models, refer to decision models or functions that can be used to generate a machine learning output from a data input. Machine learning outputs may refer to any action or decision recommended by a calibrated ML model based on a data input. Data inputs may include any data described herein. For example, a data input may include an error message, and a machine learning output may include a response to the error message. In some embodiments, an uncalibrated ML model includes a decision model or function with certain elements or coefficients that are undefined or indeterminate. In some embodiments, a calibrated ML model includes a decision model or function with certain elements or coefficients that have been defined by ML methods and algorithms based on input training data.

Training data may vary depending on the type of model being trained, but in general, training data refers to data which can be processed by ML methods and algorithms in order to generate function elements and define any undefined or partially defined elements in a calibrated or uncalibrated ML model. For example, an uncalibrated ML model may include a function with a number of undefined coefficients. A supervised learning algorithm may process training data, determine function elements, and define the function coefficients in the ML model based on the function elements, thus generating a calibrated ML model. As used herein, training data is not limited to supervised learning methods, but also includes data used to develop ML models using unsupervised or reinforcement learning methods. Training data may include any of the data discussed herein, particularly language data and system data (described in more detail below).

Language data may include natural language processing ("NLP") models, language parsing models, skills recognition models, grammar, vocabulary, and syntax rules, and user-specific language data. Natural language processing ("NLP") involves computer processing and/or computer analysis of spoken or written language, and may involve speech recognition, natural language understanding, and/or natural language generation. NLP models include but are not limited to models for translating speech to text, models for interpreting the meaning of natural language text, and/or models for translating text to speech. Language parsing models include but are not limited to models for interpreting a computer command from natural language text. In some embodiments, language parsing models may overlap with NLP models, such as in models for interpreting the meaning of natural language text, which may be considered both an NLP model and a language parsing model. Skills recognition models include but are not limited to models for identifying and executing skills specified in a voice command or text command. Skills may refer to software applications, programs, and/or other commands or services that can be performed, implemented, or otherwise activated by the AD computing device to carry out a task. Grammar, syntax, and vocabulary rules refer to grammar rules, syntax rules, and vocabulary definitions that can be used to interpret a given language, and they may include any rules or data used as input for the language models. User-specific language data refers to any data related to the language or speech of a specific user or a specific group of users. In particular, user-specific language data may contain data related to user-accents, user vocabulary tendencies, user grammar and syntax tendencies, user idiomatic tendencies, and any other language-tendencies particular to a user or a group of users.

As an example that demonstrates a potential relationship between different types of language data, the AD computing device may receive a voice input from a user computing device. The AD computing device may utilize an NLP model to translate a voice input into a text input and attribute meaning to the text input, utilize a language parsing model to identify a user-command contained within the text input, and utilize a skills recognition model to identify a particular software application that can be used to carry out the user-command. The three models may all rely on grammar, syntax, and vocabulary rules for carrying out their given actions.

System data may include any data referring to previous data inputs, user actions, system outputs, application responses, errors, and/or computer instructions. In particular, system data includes usage data, instructions data, application response data, and error log data. Usage data refers to decisions, actions, and/or inputs implemented or issued by a user or a plurality of users, all of which may or may not be in response to certain system inputs and/or outputs. In particular, usage data may include voice inputs, user-commands, and/or user response data. For example, in response to an error message, a user may make a specific remedial action, and that action in response to the error message would be stored as usage data. Usage data includes both specific usage data and general usage data. Specific usage data includes usage data specific to a single user or to a specific group of users. General usage data includes usage data across multiple users. In one example general usage data may be used as training data to develop a ML model for an AD computing device. In another example, specific usage data may be used as training data to further develop ML models and customize the ML models to take into account the behaviors of a specific user or a small group of users.

Instructions data refers to any data transmitted from the AD computing device to other servers, databases, or applications. In particular, instructions data includes deployment instructions, revised instructions, and third party application instructions. Deployment instructions refer to instructions transmitted by AD computing device to the automation server or the deployment server. In the exemplary embodiment, deployment instructions contain instructions which cause or facilitate the automation server and/or deployment server to deploy particular software, and they may further contain a specified server onto which the software should be deployed. In some embodiments, deployment instructions also refer to any communication sent from the AD computing device to the automation server and/or deployment server, such as server health checks, server status inquiries, smoke test checks, deployment status inquiries, and any other communication sent from the AD computing device to the automation server and/or deployment server. Revised instructions refer to instructions transmitted by AD computing device to the automation server and/or the deployment server in response to receiving a message from the automation server and/or the deployment server. In particular, revised instructions refer to any communication sent from the AD computing device to the automation server and/or deployment server in response to receiving application response data from the automation server and/or deployment server (described in more detail below). Third party application instructions refer to any communication sent from the AD computing device to the third party applications server and/or any third party applications.

Application response data refers to any data received from third party applications, a third party application server, a deployment server, an automation server, an automation database, and/or any other server. In the exemplary embodiment, application response data includes server status data, server response messages, and third party application responses. Server status data refers to the health or status of a server, which may include server activity levels (e.g., "on" or "off"), server capacity (e.g., "full", "nearly full", "half-capacity", "ample capacity", etc.), or other indicators of a server's status. In some embodiments, the server status data includes indicators of deployment progress, estimated deployment completion time, smoke test results, and/or any other data related to the status of the server or software applications running on the server. Server response messages refer to any messages sent from the automation server or deployment server. In some embodiments, the server response messages are sent from the automation server and/or deployment server to the AD computing device in response to the AD computing device transmitting instructions to the automation server and/or deployment server. In some embodiments, the server response messages include error messages. In some embodiments, server response messages and server status data may overlap. Third party application responses refer to any messages or communications sent from a third party applications server and/or any third party applications to the AD computing device. Third party application responses may include the status or health of third party applications, errors associated with a particular process, and or any other data associated with the third party applications.

Error log data refer to any errors, with or without associated solutions, encountered during processes implemented in an AD computing system, such as receiving a voice input, receiving additional data from an automated database, determining a user command contained in the voice input, communicating with an automation server, deploying software to a deployment server, or sending third party application instructions to a third party applications server. Errors may include associated solutions, which refer to any solution which remedies the error and/or allows a process to proceed. For example, error log data may include a known error indicating a specified server is inactive, and an associated solution indicating that software should be deployed to a backup server in response to the error. In some embodiments, error log data may be collected from third party databases or websites. In some embodiments, error log data may overlap with application response data.

Based on the voice input, ML data, and language data, the AD computing device generates deployment instructions for deploying software on the deployment server and transmits the deployment instructions to the automation server. Specifically, the AD computing device includes a machine learning ("ML") module, a language module, and an instructions module; the AD computing device utilizes these three modules to generate deployment instructions based on received data inputs. The machine learning module utilizes training data, such as system data, to develop calibrated language models and a calibrated instructions model, which are utilized by the language module and the instructions module respectively to more effectively carry out their operations. The language module receives a voice input, and, based on the calibrated language models and language data, the language module determines a user-command associated with the voice input and transmits the user-command to the instructions module. The instructions module receives the user-command, and based on the calibrated instructions model, language data, and system data, generates deployment instructions meant to implement the user-command within a computer system. In some embodiments, the instructions module receives the user-command, and based on the calibrated instructions model, language data, and system data, generates a notification for collecting user-input and utilizes the user response data to generate deployment instructions. Further, the AD computing device may utilize the user response data to update the calibrated instructions model and create a customized instructions model which takes into account the preferences of a specific user or a specific group of users.

In the exemplary embodiment, the ML module utilizes ML data, such as calibrated and uncalibrated ML models, training data, and ML methods and algorithms, to generate calibrated ML models, which include calibrated/customized language models and a calibrated/customized instructions model, which are utilized by the language module and instructions module respectively. In the exemplary embodiment, the ML module receives ML data from the automation database. The ML module utilizes ML methods and algorithms to process training data and generate function elements, which include coefficients and/or any other data elements associated with a function or a decision model. The ML module is configured to apply function elements to an uncalibrated ML model and generate a calibrated ML model. The ML module is configured to generate calibrated language models, such as a natural language processing "NLP" model, a parsing model, and an application recognition model, and transmit the calibrated language models to the language module in order to enable more effective language processing by the AD computing device. The ML module is further configured to generate a calibrated instructions model and/or a customized instructions model and transmit the calibrated instructions model and/or customized instructions model to the instructions module in order to enable more effective deployment and third party application communication by the AD computing device.

In the exemplary embodiment, the language module is configured to receive a voice input, translate the voice input into text, determine a meaning of the voice input, determine a user-command contained in the voice input, and transmit the user-command to the instructions module. In order to carry out the aforementioned processes, the language module is configured to utilize at least one calibrated language model, a decision-making model that generates a particular output based on data inputs. In some embodiments, at least one calibrated language model is generated by the ML module as described above. In the exemplary embodiment, the language module employs a natural language processing ("NLP") model, a parsing model, and a skills recognition model. The language module is configured to utilize the NLP model for converting a voice input into text input and attributing meaning to the text input. The language module is further configured to utilize the parsing model for identifying a user-command in the text input. The language module is also configured to utilize the skills recognition model to identify any skills (described in more detail below) contained in the user-command. The language module is further configured to transmit the user-command and identified skills to the instructions module.

In the exemplary embodiment, the instructions module is configured to receive a calibrated instructions model from the ML module and a user-command from the language module. The instructions module is further configured to utilize the calibrated instructions model, user-command, system data, and language data to generate deployment instructions, which cause a server to deploy a specific code, and transmit the deployment instructions to an automation server. In the exemplary embodiment, the instructions module is also configured to utilize the calibrated instructions model and additional data to generate third party application instructions, which cause the third party applications server to implement some action on a third party application, and transmit the third party application instructions to the third party application server.

In the exemplary embodiment, the instructions module is further configured to receive application response data, such as an error message, from the automation server, deployment server, and/or third party applications server. By utilizing the calibrated instructions model, the instructions module processes the application response data and additional data and generates at least one of (i) a notification asking for user input or (ii) revised instructions for the automation server, deployment server, and/or third party application server. The AD computing device is configured to transmit the notification to a user computing device and receive user response data on how to proceed based on the application response data. Based on the user response data the instructions module may generate revised instructions for the automation server, deployment server, and/or third party application server. Based on the user response data, which may be considered specific usage data, the AD computing device may update its machine learning models and generate a customized instructions model that allows the instructions module to respond to subsequent application response data in a way that is more consistent with the preferences of a user or a group of users.

The methods and systems described herein may be implemented using computer programming or engineering techniques including computer software, firmware, hardware or any combination or subset thereof, wherein the technical effects may be achieved by performing the computer operations described herein, which may include, but are not limited to, the following steps: (i) receiving a voice input from a user computing device; (ii) extracting a user command from the voice input; (iii) generating deployment instructions based on the user command, wherein the deployment instructions are computer-executable instructions for causing the deployment of the code on the first server; (iv) transmitting the deployment instructions to an automation server; (v) receiving application response data from the automation server; (vi) generating revised instructions based on the application response data, wherein the revised instructions are computer-executable instructions for causing the deployment of the code on a second server; (vii) transmitting the revised instructions to the automation server; (viii) generating a notification requesting a response from a user; (ix) transmitting the notification to a user computing device; (x) receiving a user response in the form of user response data from the user computing device; (xi) generating revised instructions based on the application response data and user response data, wherein the revised instructions are computer-executable instructions for causing the deployment of the code on a second server; (xii) utilizing a trained decision model to generate deployment instructions and revised instructions, wherein the trained decision model is trained using machine learning techniques; (xiii) updating the trained decision model, using the machine learning techniques, based on the user response data; (xiv) generating third party application instructions based on the user command, wherein the third party application instructions are computer-executable instructions for causing some action within a third party software application; and (xv) transmitting the third party application instructions to a third party application server.

The technical benefits achieved by the methods and systems described herein include: (a) increasing the speed, accuracy, and automation of code deployment, thereby enabling more efficient and reliable evolution of a computer system or a computer application; (b) preventing the addition of unnecessary human error through automation of code deployment processes; (c) increasing computer system security by reducing reliance on external inputs in code deployment processes; (d) enabling the calibration of a machine learning decision model for generating code deployment instructions based on voice-input and/or response data; (e) enabling a customized machine learning model capable of generating actions based on the usage data of a specific user or specific group of users; and (e) automating interactions between an automation server and third party applications, thereby increasing the speed of and reducing errors in intra-server communication.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an exemplary embodiment, the system is executed on a single computer system, without requiring a connection to a sever computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The system is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in a variety of applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 illustrates a block diagram of automated deployment ("AD") computer system 100, which may be used to automatically deploy software based on voice-input from a user. In the exemplary embodiment, AD computer system 100 includes AD computing device 102, which includes machine learning ("ML") module 114, language module 116, instructions module 118, and memory 120. AD computer system 100 further includes automation server 106, deployment servers 108, third party applications server 110, user computing device 104, and automation database 122, all of which are in communication with AD computing device 102. In the exemplary embodiment, deployment servers 108 includes one or a plurality of servers onto which software can be deployed.

In the exemplary embodiment, AD computing device 102 is configured to receive a voice-command to deploy software on a particular server, translate the voice-command into computer-executable instructions, and send the computer-executable instructions to automation server 106 to facilitate the deployment of the software on deployment servers 108. In some embodiments, AD computing device 102 is configured to communicate directly with deployment server 108. Further, AD computing device 102 is configured to receive feedback from automation server 106, such as an error message, and determine a course of action based on the error message. In one embodiment, AD computing device 102 receives an error message and sends a notification to user computing device 104 asking for a user response. AD computing device 102 is configured to "learn" from the user response in order to automatically respond to subsequent error messages. In another embodiment, AD computing device 102 receives an error message and determines an alternative course of action and implements that course of action.

As an example, a user may interact with user computing device 104, such as a virtual assistant, and provide the voice-input "Virtual Assistant X, deploy software A on server B." AD computing device 102 may receive the voice-input from user computing device 104, determine the user-command includes deploying software A on server B, and generate deployment instructions which facilitate or cause automation server 106 to deploy software A on server B. AD computing device 102 may transmit the instructions to automation server 106 and receive a response indicating that server B is offline. AD computing device 102 may then send a notification to user computing device 104 describing the error message and asking for a user response. AD computing device 102 may then receive a user response indicating that software A should be deployed to server C, and may generate instructions for deploying software A to server C. The AD computing device 102 may store the user-response in memory 120 and utilize the user-response to subsequently deploy code to server C when server B is offline.

In the exemplary embodiment, AD computing device 102 is also configured to interact with third party applications server 110 in order to implement certain actions through third party software applications 112. AD computing device 102 is configured to transmit instructions to third party applications server 110 that cause third party applications server 110 to utilize one or more third party software applications 112 to generate an outcome specified by AD computing device 102. For example, AD computing device 102 may send instructions to third party applications server 110 that cause third party applications server 110 to access a third party software application such as Messaging Application Z, and post a message on through Messaging Application Z. In some embodiments, AD computing device 102 communicates directly with third party software applications 112.

In the exemplary embodiment, AD computing device 102 includes ML module 114, language module 116, and instructions module 118, which are utilized by AD computing device 102 to carry out actions described in more detail below. In some embodiments, ML module 114, language module 116, and instructions module 118 are local to AD computing device 102. In other embodiments, ML module 114, language module 116, and instructions module 118 are external to AD computing device 102.

In the exemplary embodiment, AD computing device 102 is also communicably coupled to automation database 122, which may be located remotely or locally in relation to AD computing device 102. In some embodiments, AD computing device 102 communicates with automation database 122 through a database server. AD computing device 102 is configured to access automation database 122 to store and/or retrieve data. Automation database 122 is configured to store any of the datatypes discussed herein, which include but are not limited to: voice-inputs, user-commands, user-instructions, specified servers, specified applications, machine learning data, language data, system data, instructions data, deployment instructions, third party application instructions, revised instructions, application response data, notifications, and user-responses.

Figure 2:
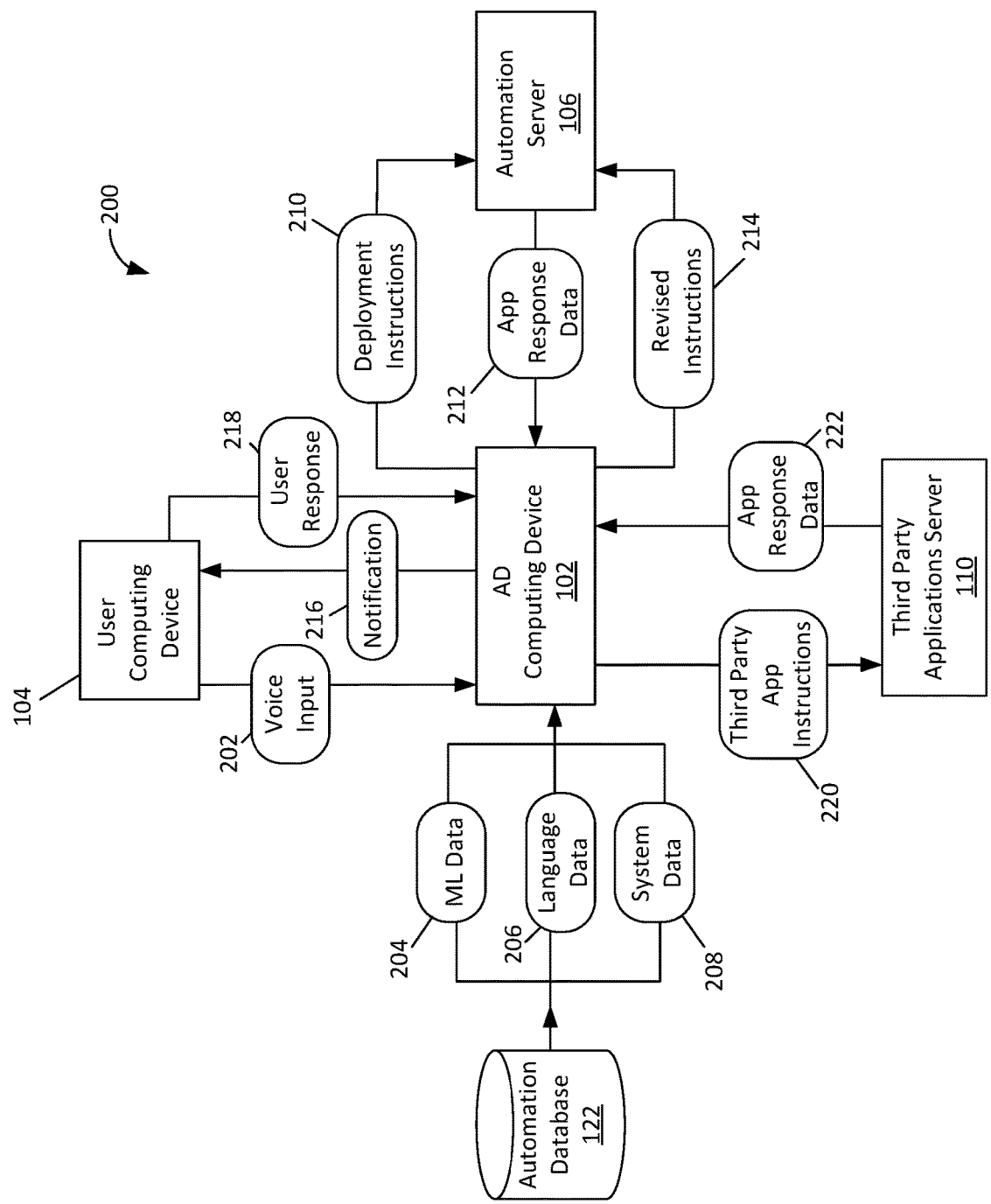

FIG. 2 illustrates a data flow diagram depicting data flow 200 within an AD computing system, such as AD computing system 100 (shown in FIG. 1). In the exemplary embodiment, AD computing device 102 is configured to receive data from automation database 122, user computing device 104, automation server 106, and third party applications server 110. AD computing device 102 is further configured to process and send data to automation database 122, user computing device 104, automation server 106, and third party applications server 110.

In the exemplary embodiment, AD computing device 102 receives voice input 202 from user computing device 104. Voice input 202 includes an audio recording of a user-command, and may further include a wake-word. In some embodiments, the user-command includes a user-instruction, specified server, and/or specified application. For example, voice input 202 may include an audio recording of a user saying "Virtual Assistant X, tell Automation Server Y to deploy software A to B", where "Virtual Assistant X" is a wake-word and "tell Automation Server Y to deploy software A to B" is a user-command which includes the user-instructions "deploy software A", the specified server "B", and the specified application "Automation Server Y".

In the exemplary embodiment, AD computing device 102 is further configured to receive machine learning ("ML") data 204, language data 206, and/or system data 208 from automation database 122. ML data 204 includes uncalibrated decision models, calibrated decision models, such as calibrated language models and calibrated instructions models, ML methods and algorithms, function elements, and/or training data. Language data 206 includes natural language processing ("NLP") models, language parsing models, skills recognition models, user-specific language data, and grammar, syntax, and vocabulary rules. In some embodiments, the NLP, language parsing, and skills recognition models are calibrated or uncalibrated decision models and may also be included under ML data 204. System data 208 includes any data referring to previous data inputs, user actions, system outputs, application responses, errors, and/or computer instructions. In particular, system data 208 includes usage data, instructions data, application response data, and error log data.

In the exemplary embodiment, AD computing device 102 is configured to process voice input 202, along with ML data 204, language data 206, and/or system data 208, and generate instructions such as deployment instructions 210, revised instructions 214, and/or third party application instructions 220. AD computing device 102 is configured to transmit deployment instructions 210 to automation server 106. AD computing device 102 is further configured to receive application response data 212 from automation server 106 based on the transmission of deployment instructions 210. In response to receiving application response data 212, AD computing device 102 is configured to generate at least one of notification 216 and revised instructions 214. In one embodiment, AD computing device 216 transmits notification 216 to user computing device 104 and receives user response 218. AD computing device 102 is configured to process user response 218 and generate revised instructions 214. Based on user response 218, AD computing device 102 may learn to generate revised instructions 214 in response to subsequent application response data 212 without requiring an additional user response.

In the exemplary embodiment, AD computing device 102 is configured to generate third party application instructions 220, and transmit third party application instructions 220 to third party applications server 110. AD computing device 102 is further configured to receive application response data 222 from third party applications server 110. AD computing device 102 generates third party application instructions 220 based on voice input 202, ML data 204, language data 206, and/or system data 208, and may further take user response 218, application response data 212, and/or application response data 222 into account. In one embodiment, AD computing device 102 generates third party application instructions 220 in response to receiving voice input 202. In another embodiment, AD computing device 102 generates third party application instructions 220 in response to receiving application response data 212 and/or user response 218. In yet another embodiment, AD computing device 102 generates third party application instructions 220 in response to receiving application response data 222.

Figure 3:
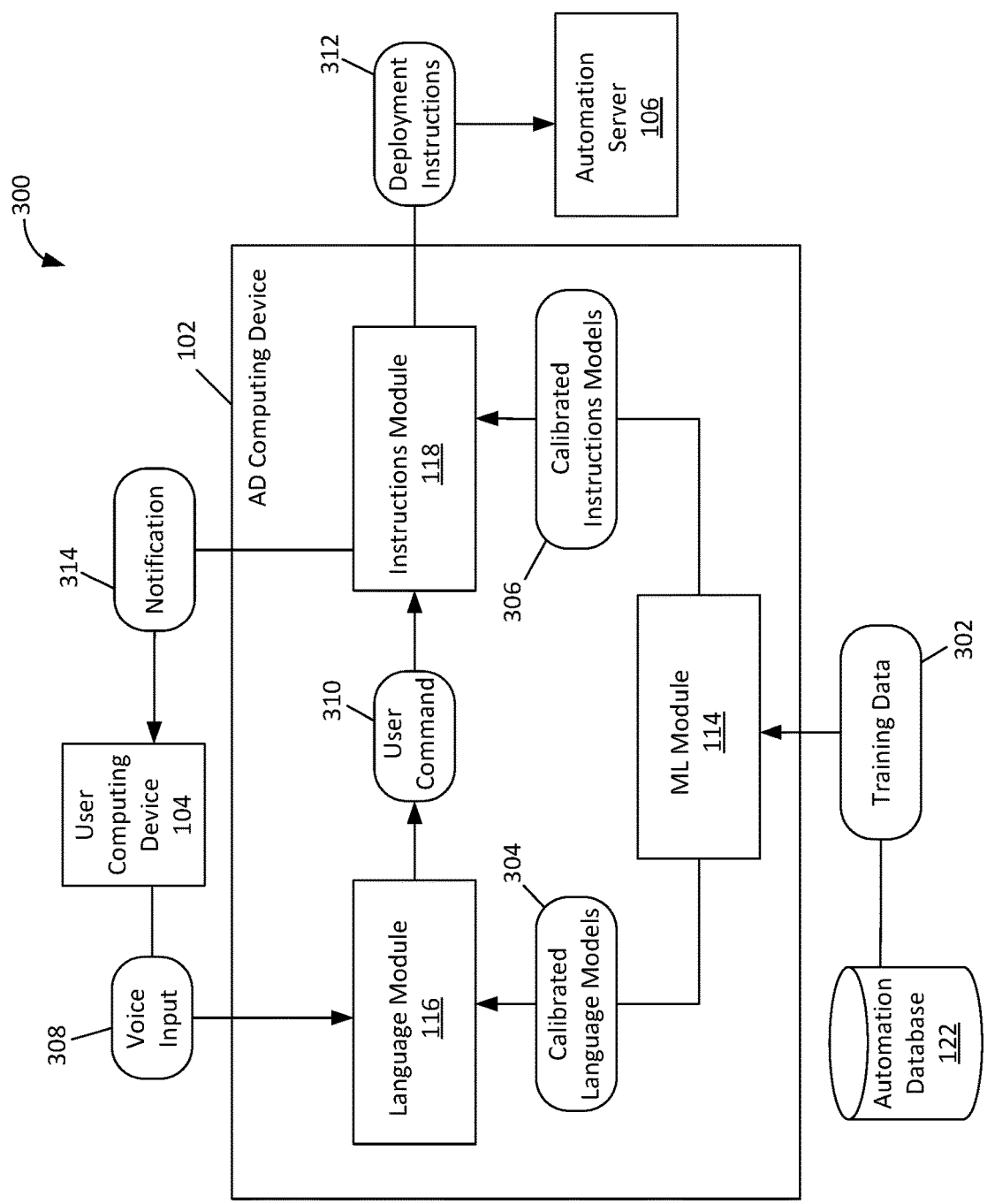

FIG. 3 illustrates a data flow diagram depicting data flow 300 between the modules of AD computing device 102. In the exemplary embodiment, AD computing device 102 includes machine learning ("ML") module 114, language module 116, and instructions module 118. AD computing device 102 is in communication with user computing device 104, automation database 122, and automation server 106.

In the exemplary embodiment, AD computing device 102 receives training data 302 from automation database 122. Training data refers to any data that can be processed by ML module 114 in order to generate calibrate decision models. In alternative embodiments, AD computing device 102 receives additional data, such as other ML data, language data, and/or system data from automation database 122. AD computing device 102 is configured to use ML module 114 to process training data 302 and generate calibrated decision models, such as calibrated language models 304 and calibrated instructions models 306. In one embodiment, ML module 114 processes training data 302 using machine learning ("ML") methods and algorithms, generates function elements, and applies the function elements to an uncalibrated decision model in order to generate a calibrated decision model. ML module 114 is configured to transmit calibrated decision models to language model 116 and instructions module 118. In particular, ML module 114 is configured to transmit calibrated language models 304 to language module 116 and calibrated instructions models 306 to instructions module 118. For example, ML module 114 may utilize training data that associates audio recordings with associated text language. ML module 114 may process the training data using a supervised learning algorithm, generate a natural language processing ("NLP") model, and transmit the NLP model to language module 116.

In the exemplary embodiment, AD computing device is configured to receive voice input 308 from user computing device 104. AD computing device is further configured to use language module 116 to generate user command 310 from voice input 308. Language module 116 is configured to utilize calibrated language models 304 to process voice input 308 and generate user command 310. Language models 304 include, but are not limited to, NLP models, language parsing models, and skills recognition models. Additionally, any of the language models may be customized language models generated by ML module 114 based on user-specific language data. Language module 116 is configured to process voice input 308 and generate a text input of the words spoken in voice input 308. Language module 116 is further configured to assign meaning to the text input and parse the text input into different components, such as a wake word and a user command, which may include a user instruction, specified application, and/or specified server. Language module 116 is configured to identify user command 310 from the parsed components and transmit user command 310 to instructions module 118. In one example, language module 116 receives a voice input that contains an audio recording of the words "deploy A to B". Language module 116 may generate text input from the audio and assign meaning to the text input, such as an indication that the voice input is requesting AD computing device 102 to deploy software A on server B. Further, language module 116 may parse the text input and determine that "deploy A to B" is a user command, "deploy A" is a user-instruction, and "B" is a specified server. Language module 116 may then transmit the user command to instructions module 118.

In the exemplary embodiment, instructions module 118 is configured to receive user command 310 and generate computer-executable instructions, such as deployment instructions 312, based on user command 310. Instructions module 118 is configured to use calibrated instructions models 306 to generate deployment instructions 312 based on user command 310. In the exemplary embodiment, calibrated instructions models 306 contain at least one decision model that assists instructions module 118 in generating computer-executable instructions based on user command 310. Instructions module 118 may receive user command 310, along with other system data, and determine, based on models and/or functions contained in calibrated instructions models 306, a particular output based on user command 310. Instructions module 118 may transmit that output, such as deployment instructions 312, to automation server 106.

In the exemplary embodiment, instructions module 118 is also configured to generate notification 314 as an output, and transmit notification 314 to user computing device 104. In some embodiments, instructions module 118 generates notification 314 based on user command 310. In some embodiments, instructions module 118 generates notification 314 based on a response received from automation server 106. In still other embodiments, instructions module 118 generates notification 314 and deployment instructions 312 based on user command 310.

In the exemplary embodiment, user command 310, deployment instructions 312, and notification 314 are stored as system data in automation database 122 and may be subsequently utilized by ML module 114 to generate calibrated language models 304 and calibrated instructions models 306, which include customized language models and customized instructions models respectively.

Figure 4:
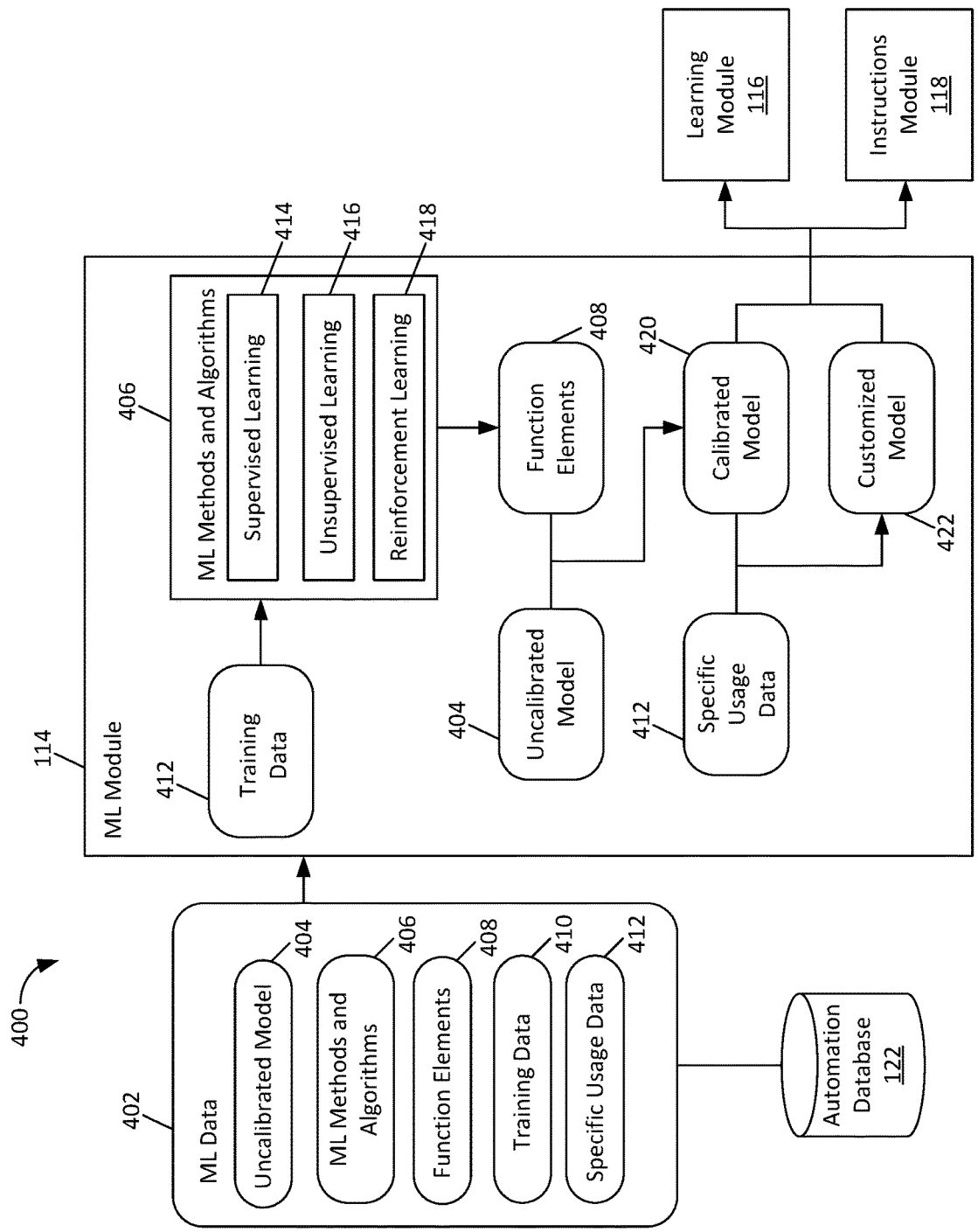

FIG. 4 illustrates a data flow diagram depicting data flow 400 within machine learning ("ML") module 114 and between ML module 114, automation database 122, learning module 116, and instructions module 118. In general, ML module 114 is utilized by AD computing device 102 (shown in FIG. 1) in order to help AD computing device 102 "learn" to analyze, organize, and/or process data without being explicitly programmed. Specifically, ML module 114 is utilized by AD computing device 102 to generate calibrated models 420 and customized models 422, which are utilized by AD computing device 102 to make decisions based on certain inputs. In the exemplary embodiment, ML module 114 receives ML data 402 from automation database 122, and utilizes ML methods and algorithms 406 to generate calibrated decision models, such as calibrated models 420 and customized models 422. ML module 114 is further configured to transmit calibrated models 420 and customized models 422 to learning module 116 and instructions module 118, where the models may be used to assist in language processing and instructions generation.

In the exemplary embodiment, ML module 114 receives ML data 402 from automation database 122. ML data 402 includes, but is not limited to, uncalibrated models 404, ML methods and algorithms 406, function elements 408, training data 410, and specific usage data 412. ML module 114 utilizes ML methods and algorithms 406 to process training data 412 and generate function elements 408, which include coefficients and/or any other data elements associated with a function or a decision model. ML module 114 is configured to apply function elements 408 to uncalibrated model 404 and generate calibrated model 420. Uncalibrated model 404 may be any decision-making model or function with undefined or partially defined coefficients and/or function elements. ML module 114 is further configured to utilize specific usage data 412 to further adapt calibrated model 420 to a particular user or group of users, thereby generating customized model 422. ML module 114 is configured to transmit calibrated model 420 and customized model 422 to learning module 116 and/or instructions module 118. In some embodiments, ML module 114 is configured to store calibrated models 420 and customized models 422 in automation database 122.

In the exemplary embodiment, ML module 406 is configured to utilize ML methods and algorithms 406, which may include a variety of methods and algorithms such as: linear or logistic regression, instance-based algorithms, regularization algorithms, decision trees, Bayesian networks, cluster analysis, association rule learning, artificial neural networks, deep learning, dimensionality reduction, and support vector machines. ML methods and algorithms 406 are generally directed toward at least one of a plurality of categorizations of machine learning, including supervised learning methods 414, unsupervised learning methods 416, and reinforcement learning methods 418. ML module 114 is configured to apply ML methods and algorithms 406 to processes training data 402, which includes system data such as usage data, application response data, instructions data, and error log data, in order to determine function elements 408. In other words, ML module 114 uses ML methods and algorithms 406 determine, identify, or define relationships and/or patterns in training data 410, and generate function elements 408 describing those relationships and/or patterns. ML module 114 then uses function elements 408 to develop calibrated model 420 from uncalibrated model 404.

In one embodiment, ML module 114 utilizes supervised learning methods 414, which involve defining relationships in organized and/or labeled data to make predictions about subsequently received data. Using supervised learning 414, ML module 114 receives training data 410 that includes training inputs and associated training outputs. For example, for a system attempting to identify images including cats, the training data would include an image (the training input) and an associated label specifying whether or not the image includes a cat (the training output). ML module 114 uses supervised learning methods 414 to process training data 410 and generate function elements 408 that, when applied to uncalibrated model 404, effectively map outputs to certain inputs. In one example, ML module 114 receives training data 410 that includes voice inputs and user commands contained within those voice inputs. ML module 114 may process the training data using a supervised learning algorithm and generate function elements that map certain user commands to certain voice inputs.

In another embodiment, ML module 114 utilizes unsupervised learning methods 416, which involve finding meaningful relationships in unorganized data. Unlike supervised learning methods 414, unsupervised learning methods 416 do not utilize training data that includes labeled inputs and associated outputs. Rather, training data 410 is unorganized, and ML module 114 utilizes unsupervised learning methods 416 to determine or identify relationships within training data 410 and generate function elements 408 that, when applied to uncalibrated model 404, effectively describe these relationships. In one example ML module 114 receives training data 410 that includes unorganized general usage data and error log data. ML module 114 may process the training data using an unsupervised learning algorithm, identify relationships between general usage data and error log data, and generate function elements that represent the identified relationships.

In another embodiment, ML module 114 utilizes reinforcement learning methods 418, which involve optimizing outputs based on feedback from a reward signal. Specifically, reinforcement learning methods 418 include a user-defined reward signal definition, which provides a reward signal based on an output generated by a decision-making model, such as uncalibrated model 404 or calibrated model 420. The decision-making model receives a data input, generates an output, and receives a reward signal based on the output. Reinforcement learning methods 418 are configured to adjust function elements 408 based on the strength of the reward signal, so as to receive stronger rewards signals for subsequently received data inputs. In one example, ML module 114 may define a reward signal for a reinforcement learning algorithm, such that a high user satisfaction rating correlates with a strong reward signal. ML module 114 may receive training data including an error message, and the ML module 114 may utilize an uncalibrated or calibrated model to process the error message and generate revised instructions. The ML module 114 may receive further training data that includes a user satisfaction rating associated with the revised instructions, and based on the reward signal received for a certain user satisfaction rating, defines function elements for the decision model such that the decision model generates revised instructions outputs that receive higher user satisfaction ratings.

In the exemplary embodiment, regardless of the specific ML methods and algorithms 406 used to generate function elements 408, ML module 114 is configured to apply function elements 408 to uncalibrated model 404 in order to generate calibrated model 420. For example, ML module 114 may utilize an unsupervised learning algorithm to process training data, including text input and specified servers contained in the text input, and generate function elements that map certain specified servers to certain text inputs. ML module 114 may then apply the function elements to an uncalibrated model and generate a calibrated model that can be used to output specified servers upon receiving a text input. In the exemplary embodiment, ML module 114 is configured to store calibrated model 420 in automation database 122. ML module 114 is further configured to transmit calibrated model 420 to language module 116, instructions module 118, and/or any memory local to AD computing device 102.

In the exemplary embodiment, ML module 114 is configured to update calibrated model 420 and generate customized model 422. Whereas ML module 114 generates calibrated model 420 based on general usage data that takes into account the actions of many different users, ML module 114 generates customized model 422 based on both general usage data and specific usage data, such that customized model 422 is configured to generate outputs adapted to a specific user or group of users. Specifically, ML module 114 generates calibrated model 420, utilizes ML methods and algorithms 406 to process specific usage data 412 and generate customized function elements, and generates customized model 422 based on the customized function elements. In some embodiments, ML module 114 receives calibrated model 420 from automation database 122. In some embodiments, ML module 114 utilizes function elements to adjust the elements and/or coefficients of calibrated ML model 422. In one example, ML module 114 receives a calibrated machine learning model and a supervised learning algorithm from the automation database, along with training data that includes error log data and user response data. ML module 114 may utilize the supervised learning algorithm to process the training data, establish a relationship between certain errors and user responses to those errors, and generate function elements describing the relationship. The ML module may then apply the function elements to the calibrated model to adjust elements and/or coefficients of the model such that the calibrated model is customized to a specific user or group of users included in the user response data.

In some embodiments, ML module 114 is configured to generate customized model 422 from uncalibrated model 404, rather than developing calibrated model 420 in the interim. Specifically, ML module 114 is configured to receive training data 412 that includes specific usage data, such as specific usage data 412. ML Module 114 utilizes ML methods and algorithms 406 to process training data 410 and generate function elements 408 which already take data related to specific users into account. ML module 114 then applies function elements 408 to uncalibrated model 404 and generates customized model 422.

In one embodiment, ML module 114 is configured to receive usage data and map user-responses to application response data 612. Specifically, the AD computing device 102 is configured to link associated system data, such as deployment instructions, revised instructions, application response data, notifications, voice inputs, voice commands, and user response data, and store the associated data points in automation database 122. ML module 114 is configured to access the system data, for example in the form of training data 410, and generate calibrated and customized models based on associations within the system data.

In one embodiment, user response data for a specific user or group of users in response to notifications may be stored as specific usage data 412 and used by ML module 114 to create customized models. In other words, when AD computing device 102 receives application response data, transmits a notification to a user computing device, and receives user response data in response to the notification, ML module 114 is able to utilize the user response data in order to further improve decision-making models. For example, in response to transmitting a notification indicating that server A is offline, AD computing device 102 may receive user response data indicating that software should be deployed to server B. Based on the user response data, ML module 114 may update its calibrated instructions model so that subsequent requests to deploy to offline server A are automatically re-deployed to server B.

In the exemplary embodiment, the ML module is configured to generate calibrated and customized models 420, 422 that include calibrated/customized language models and calibrated/customized instructions models, and transmit calibrated and customized models 420, 422 to language module 116 and/or instructions module 118. Calibrated/customized language models enable language module 116 to implement more effective language processing by AD computing device 102, and they include, but are not limited to, a natural language processing "NLP" model, a parsing model, and an application recognition model. Calibrated/customized instructions models enable instructions module 118 to implement more effective communication with deployment servers and third party application servers.

Figure 5:
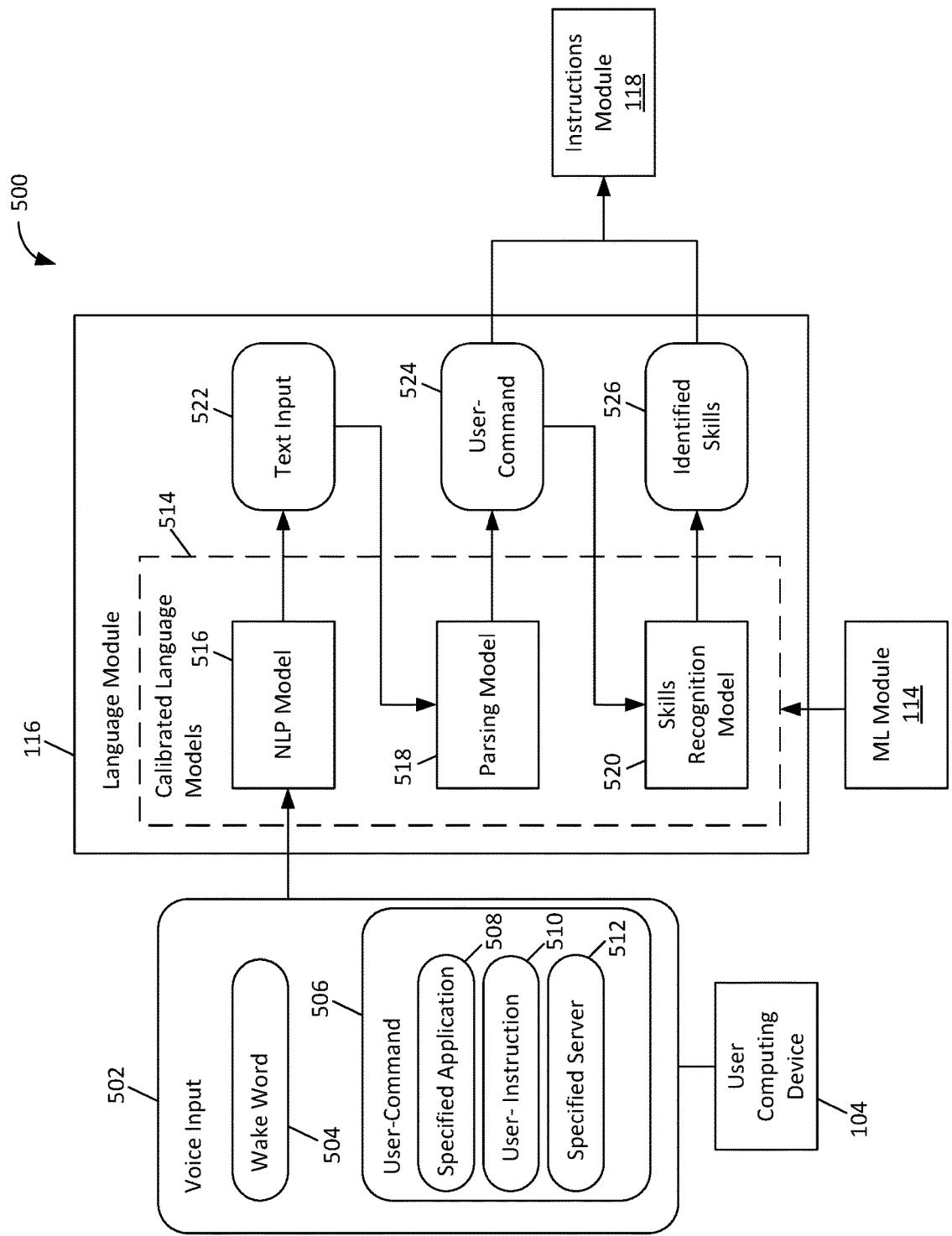

FIG. 5 illustrates a data flow diagram depicting data flow 500 within language model 116 and between language module 116, automation database 122, ML module 114, and instructions module 118. In the exemplary embodiment, language module 116 is configured to receive voice input 502 from user computing device 104, translate voice input 502 into text input 522 and determine a meaning associated with text input 522, determine user-command 524 contained in text input 522, and transmit user-command 524 to instructions module 118.

In order to carry out the aforementioned processes, language module 116 is configured to utilize at least one of a plurality of calibrated language models 514, which are decision-making models that generates a particular output based on data inputs. In some embodiments, at least one of the plurality of calibrated language models 514 is generated by ML module 114 as described above. In the exemplary embodiment, language module 116 employs natural language processing ("NLP") model 516, parsing model 518, and skills recognition model 520. Language module 116 is configured to utilize NLP model 516 for converting voice input 502 into text input 522 and attributing meaning to text input 522. Language module 116 is further configured to utilize parsing model 518 for identifying user-command 524 in text input 522. Language module 116 is also configured to utilize skills recognition model 520 to determine identified skills 526 contained in user-command 524. Language module 116 is further configured to transmit user-command 524 and identified skills 526 to instructions module 118.

In the exemplary embodiment, language module 116 is further configured to receive language data from automation database 122 (shown in FIG. 1). The language data may include calibrated language models, such as calibrated language models 514, and may further include any grammar, syntax, and/or vocabulary rules necessary for the calibrated language models to operate.

In the exemplary embodiment, language module 116 is configured to receive voice input 502 from user computing device 104. Voice input 502 may include wake word 504 and user-command 506, which may additionally include specified application 508, user-instruction 510, and specified server 512. Language module 116 employs NLP model 516 to translate voice input 502 into text input 522 and further assign meaning to text input 522. In the exemplary embodiment, text input 522 contains all the components of voice input 502 such as wake word 504, user-command 506, specified application 508, user-instruction 510, and specified server 512. NLP model 516 utilizes natural language processing ("NLP"), along with grammar, syntax, and vocabulary rules, to analyze voice input 502, translate the audio of voice input 502 to text, and determine the meaning of the text. In one embodiment, NLP model 516 includes a speech recognition model for translating audio input into text. In another embodiment, NLP model 516 determines and assigns meaning to voice input 502 without converting voice input 502 into text input 522. In one example, language module 116 applies NLP model 516 to a voice input that contains audio of the words "Virtual assistant X, deploy code A on server B". NLP model 516 converts the audio into the text "Virtual assistant X, deploy code A on server B" and assigns meaning to the phrase, such as "Phase indicates user deployment command".

In the exemplary embodiment, language module 116 is further configured to utilize parsing model 518 to parse text input 522 and determine a user-command, such as user-command 506, contained in text input 522. Parsing model 518 uses grammar, syntax, and vocabulary rules to differentiate separate components of text input 522. In other words, the parsing model determines which elements of text input 522 represent wake word 504, user-command 506, specified application 508, user-instruction 510, and/or specified server 512. Parsing model 518 is further configured to utilize the meaning attributed to text input 522 as a way to more effectively parse the text. In one embodiment, parsing model 518 receives a voice input, such as voice input 502, and determines the components of voice input 502 directly. In one example, language module 116 applies parsing model 518 to a text-input containing the words "Virtual assistant X, tell automation server Y to deploy code A on server B", and parsing model 518 determines that "Virtual assistant X" is a wake word, "deploy code A" is a user-instruction", "server B" is a specified server, and "automation server Y" is a specified application. In another example, language module 116 applies parsing model 518 to a text-input containing the words "Virtual assistant X, deploy A", and parsing model 518 determines that "Virtual assistant X" is a wake word and "deploy A" is a user-instruction.

In one embodiment, language module 116 is configured to determine that more information is required to effectively parse and/or interpret text input 522. Language module 116 is configured to communicate with AD computing device 102 such that AD computing device 102 transmits an output asking a user for additional inputs, such as inputs to clarify a previously issued voice command. In one example, AD computing device 102 asks the user to confirm that a particular portion of the user input is a user-command, wake word, or application specification. In another example, AD computing device requests the user specify the user-command, wake word, and/or application specification. In another example, AD computing device asks the user to repeat the voice input.

In the exemplary embodiment, language module 116 is further configured to utilize skills recognition model 520 to determine identified skills 526 indicated by text input 522. Identified skills 526 refer to software applications, programs, and/or other commands or services that can be performed, implemented, or otherwise activated by AD computing device 102 to carry out a task. Identified skills 526 are related user-command 506 and, in particular, specified application 508. In some embodiments, skills recognition model 520 determines identified skills 526 based on specified application 508 included in text input 522. In some embodiments, identified skills 526 refer to any third party applications and/or automation servers. For example, a user-command for sending a message to a team may include "Messaging Application Z" as a specified application, and skills recognition model 520 may identify a skill for using Messaging Application Z as the skill necessary for carrying out the user-command. In other embodiments, skills recognition model 520 determines identified skills 526 based on other elements of user-command 506, such as user-instructions 510 and/or a specific server 512. For example, a user-command may not include a specified action, but may include "deploy software AP" as a user-instruction. Skills recognition model 526 may identify a skill for using an automation server, such as Automation Server Y as the skill necessary for carrying out the user-instruction.

In the exemplary embodiment, language module 116 is configured to receive data from automation database 122, user computing device 104, ML module 114, and/or instructions module 118. Language module 116 is further configured to store data in automation database 122, such as text input 522, meanings attributed to text input 522, wake word 504, user-command 506, specified application 508, user-instructions 510, specified server 512, and/or identified skills 526. Language module 116 is further configured to transmit user-command 506, including specified application 508, user-instructions 510, and specified servers 512, and identified skills 526 to instructions module 118.

Figure 6:
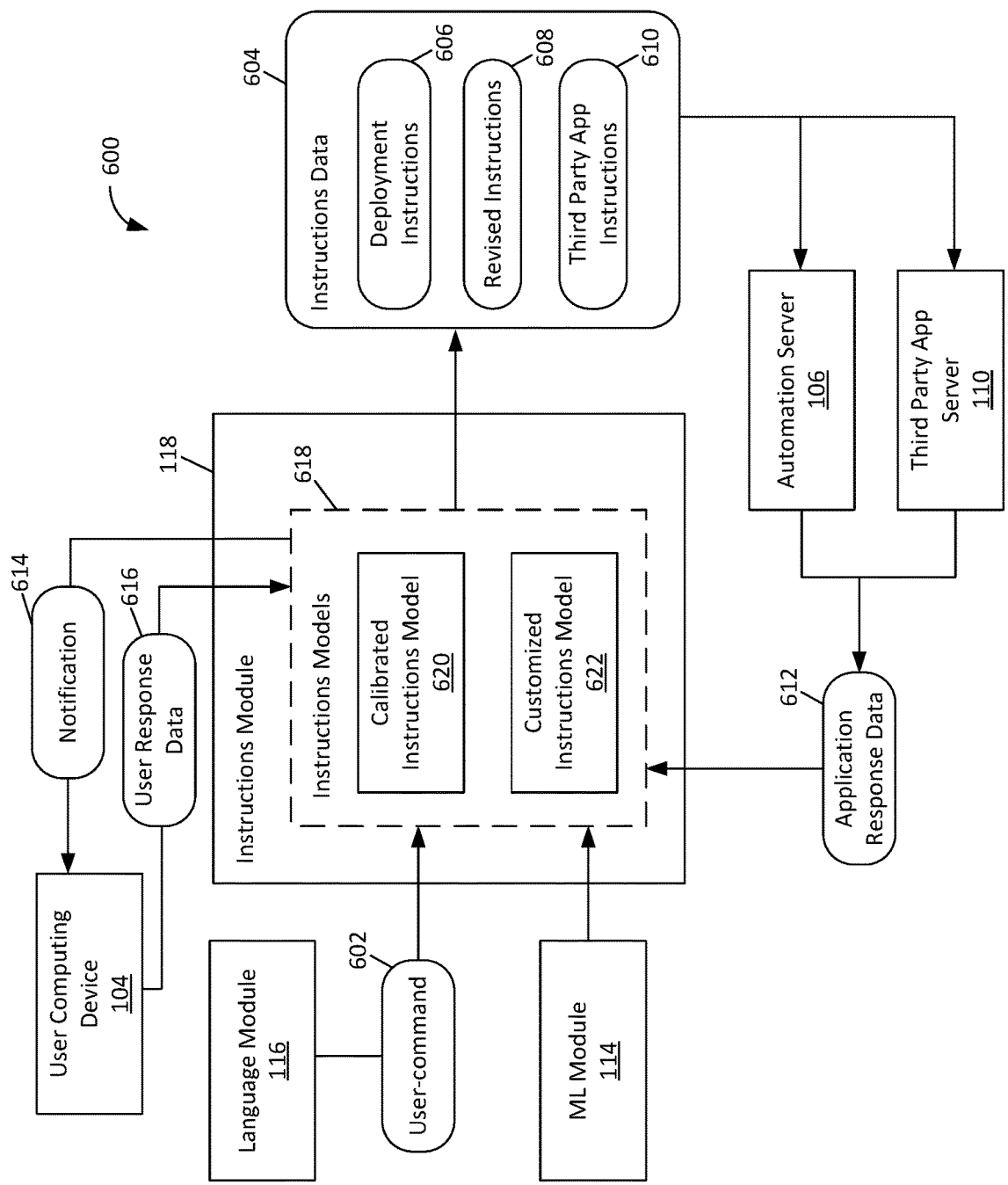

FIG. 6 illustrates a data flow depicting exemplary data flow 600 within instructions module 118 and between instructions module 118, ML module 114, language module 116, automation server 106, and deployment servers 108. In the exemplary embodiment, instructions module 118 is configured to receive a command to deploy code to a particular server. Instructions module 118 is configured to process the command, generate a computer-executable instruction based on the command, and transmit the computer-executable instruction to an automation server or some other server in order to deploy code. In some embodiments, instructions module 118 is configured to send instructions to third party applications. Instructions module 118 is further configured to receive a response from a server, such as an error message, and take action based on the response. In one case, instructions module 118 is configured to generate a notification asking for user input. In another case, instructions module 118 is configured to generate revised instructions in light of the application's response. Instructions module 118 is further configured to utilize machine learning ("ML") driven decision models to effectively generate computer executable instructions and respond to application responses.

In the exemplary embodiment, instructions module 118 is configured to receive user-command 602 from language module 116 and instructions models 618, such as calibrated instructions model 620 and customized instructions model 622, from ML module 114. Instructions module 118 is further configured to receive system data and/or language data from automation database 122 (shown in FIG. 1). In alternative embodiments, instructions module 118 receives user-command 602 and/or calibrated instructions models 618 from an automation database.

Using at least one of instructions models 618, instructions module 118 processes user-command 602 and generates deployment instructions 606, which are configured to cause or facilitate the deployment of software on a server. In some embodiments, instructions module 118 is configured to generate any type of instructions in instructions data 604, such as revised instructions 608 or third party application instructions 610, based on user-command 602. Instructions module 118 utilizes calibrated instructions model 620 and/or customized instructions model 622 to generate deployment instructions 606 based on user-command 602. In other words, user-command 602, which is determined by language module 116, is translated from natural language into computer executable instructions. For example, instructions module 118 may receive a user-command including the user-instruction "deploy software A" and the specified server "server B". Instructions module 118 may utilize calibrated instructions model 420, along with other data such as system data and/or language data, to translate the user-command into computer-executable instructions for deploying software A on server B, thereby generating deployment instructions.

In the exemplary embodiment, instructions module 118 transmits deployment instructions 606 to automation server 106, which manages the deployment of specific software on deployment servers 108 (shown in FIG. 1). In alternative embodiments, instructions module 118 transmits deployment instructions 606 directly to at least one server of deployment servers 108. Deployment instructions 606 are configured to cause or facilitate the deployment of software on a server, such as a server of deployment servers 108. In the exemplary embodiment, deployment instructions 606 specify a server on which the software should be deployed. In some embodiments, deployment instructions 606 do not specify a server on which the software should be deployed.

In the exemplary embodiment, instructions module 118 is configured to receive application response data 612 from automation server 106 in response to transmitting deployment instructions 606 to automation server 106. Application response data 612 may include any data transmitted from a server to instructions module 118 in response to the transmission of any of instructions data 604. In some embodiments, instructions module 118 receives application response data 612 directly from deployment server 108. Based on application response data 612, instructions module 118 is configured to either: (i) generate and transmit notification 614 to user computing device 104 requesting user-input for how to proceed; or (ii) process application response data 612 using at least one of instructions models 618 and generate and transmit revised instructions 608 to automation server 106 and/or deployment server 108. For example, instructions module 118 may transmit deployment instructions indicating that software A should be deployed on server B. In one instance, instructions module 118 may receive application response data from automation server 106 indicating that server B is inactive, and instructions module 118 may generate and transmit a notification to user computing device 104 asking for user input on how to proceed. In another instance, instructions module 118 may receive application response data from automation server 106 indicating that server B is inactive, and instructions module 118 may determine a response and generate revised instructions for deploying software A to serer C using calibrated instructions model 620.

In the exemplary embodiment, instructions module 118 is configured to generate and transmit notification 614 to the user computing device requesting user-input for how to proceed in response to receiving application response data 612. In the exemplary embodiment, instructions module 118 processes application response data 612 using at least one of instructions models 618, and the at least one instructions model 618 may determine that instructions module 118 requires further user-input in order to adequately respond to application response data 612. For example, instructions module 118 may receive application response data including an error message that indicates a server is offline. In the example, calibrated instructions model 620 may have no reference for responding to an offline server. Calibrated instructions model 620, upon processing the application response data, may then determine that additional user-input is required, and may send a notification to user computing device 104 asking for user-input. In some embodiments, the notification contains options from which a user can select. In some embodiments, the notification is a more open-ended inquiry, such as "how would you like to proceed?" In some embodiments, the notification simply presents the situation and allows a user to respond as they see fit. In some embodiments, the notification is a text notification. In some embodiments, the notification is a voice notification, such as an audio file played through a user computing device. In some embodiments, instructions module 118 transmits the notification as text to language module 116, and the language module converts the notification into a voice notification.

In the exemplary embodiment, instructions module 118 is further configured to receive user response data 616 from user computing device 104 in response to receiving notification 614 and generate revised instructions 608 based on user response data 616. In one embodiment, revised instructions 608 are in the form of a voice input, and AD computing device 102 (shown in FIG. 1) is configured to utilize language module 116 to translate the voice input into a text input usable by instructions module 118, as described above. In another embodiment, revised instructions 608 are in the form of text or a user selection of a finite number of options. In one embodiment, instructions module 118 receives user response data 616 as a voice input after a significant amount of time has passed since notification 614 was transmitted to user computing device 104. In such an embodiment, instructions module 118 is configured to determine if the voice input is in response to a previously transmitted notification or represents a separate user-command.

In the exemplary embodiment, instructions module 118 is configured to generate revised instructions 608, in response to receiving user response data 616, and transmit revised instructions 608 to automation server 106 and/or deployment servers 108. For example, after transmitting a notification to user computing device 104 indicating that a specific server is offline, instructions module 118 may receive user response data containing a user-command to deploy software to an alternate server. Instructions module 118 may then generate revised instructions indicating the software should be deployed to the alternate server, and instructions module 118 may transmit the revised instructions to automation server 106.

In the exemplary embodiment, instructions module 118 is further configured to generate third party application instructions 610, transmit third party application instructions 610 to third party applications server 110, receive application response data 612 from third party applications server 110, and generate and transmit third party application instructions 610 and/or revised instructions 608 in response to receiving application response data 612 from third party application server 110. Based on processing user-command 602 using one of instructions models 618, instructions module 118 is configured to generate and transmit third party application instructions 610 to a third party applications server. Third party application instructions 610 are configured to cause or facilitate certain actions within third party applications or software. In some embodiments, third party application instructions 610 are configured to cause third party applications server 110 to control a third party software application. In alternative embodiments, third party application instructions 610 are configured to directly control a third party software application. For example, instructions module 118 may receive a user-command that contains a user-instruction to post an error message on a forum. Instructions module 118 may generate and transmit third party applications instructions to third party applications server 110, where the third party application instructions are configured to cause a third party application, such as Forum Application Z, to post the error message on a forum.

In the exemplary embodiment, instructions module 118 is further configured to receive application response data 612 from third party applications server 110, generate third party application instructions 610 in response to receiving applications response data 612, and transmit third party application instructions 610 to third party applications server 110. In some embodiments, instructions module 118 is configured to generate deployment instructions 606 and/or revised instructions 608 in response to receiving application response data 612 from third party application server 110. Specifically, instructions module 118 receives application response data 612 from third party applications server 110 and uses one of instructions models 618 to generate third party application instructions 610 based on the application response data 612 and other data such as system data and/or voice input. For example, instructions module 118 may receive application response data from third party applications server 110 indicating that an error message has been posted on a forum using a third party application, such Forum Application Z. Based on the application response data, instructions module 118 may generate and transmit a third party application instruction to third party application server 110, wherein the third party application instruction causes the third party application server to send a message via a messaging application, such Messaging Application Z, indicating that the error message has been posted to the forum.

In the exemplary embodiment, instructions module 118 is further configured to receive application response data 612 from automation server 106 or deployment server 108 and generate third party application instructions based on the application response data 612. In some embodiments, instructions module 118 receives application response data 612 from automation server 106, sends a notification to user computing device 104, and generates third party application instructions based on a user response received from user computing device 104.

In the exemplary embodiment, instructions module 118 utilizes at least one of calibrated instructions model 620 and customized instructions model 622. As discussed, calibrated instructions model 620 and customized instructions model 622 are both generated by ML module 114. Instructions models 618, that is, calibrated instructions model 620 and customized instructions model 622, are decision making models that not only allow instructions module 118 to generate instructions data 604 based on user-command 602 but also to respond after receiving application response data 612. In other words, instructions models 618 allow instructions module 118 to generate instructions for deploying code and make adjustments to the instructions in the face or error messages or other responses from servers.

In the exemplary embodiment, customized instructions model 622 is similar to calibrated instructions model 620, but it is adapted to a specific user or group of users. In other words, customized instructions model 622 was trained using specific usage data, such as user response data 616, such that customized instructions model 622 generates outputs adapted to specific users. For example, instructions module 118 may attempt to deploy software A on server B, and automation server 106 may return an error message that server B is offline. Calibrated instructions module 620 may send a notification to user computing device 104 and receive user response data indicating that software A should be deployed to backup server C. ML module 114 may utilize the user response data to update the function elements of calibrated instructions module 620 and generate customized instructions module 622. Upon receiving a subsequent error message that server B is offline, customized instructions module 622 may automatically deploy software to backup server C, in accordance with the preferences of the user. In another example, instructions module 118 receives application response data from automation server 106 indicating an error in deploying to a particular server. Instructions module 118 may generate and transmit a notification asking for additional user input to user computing device 104. Instructions module 118 may receive user response data including a voice-command to post the error message on a forum, and instructions module 118 may generate and transmit third party application instructions to third party applications server 110. AD computing device 102, using ML module 114, may update a calibrated instructions model based on the user response data in order to generate a customized instructions model, and after receiving subsequent application response data from automation server 106, instructions module 118 may automatically generate third party application instructions that cause third party applications server 110 to post an error message on the forum.

Figure 7:
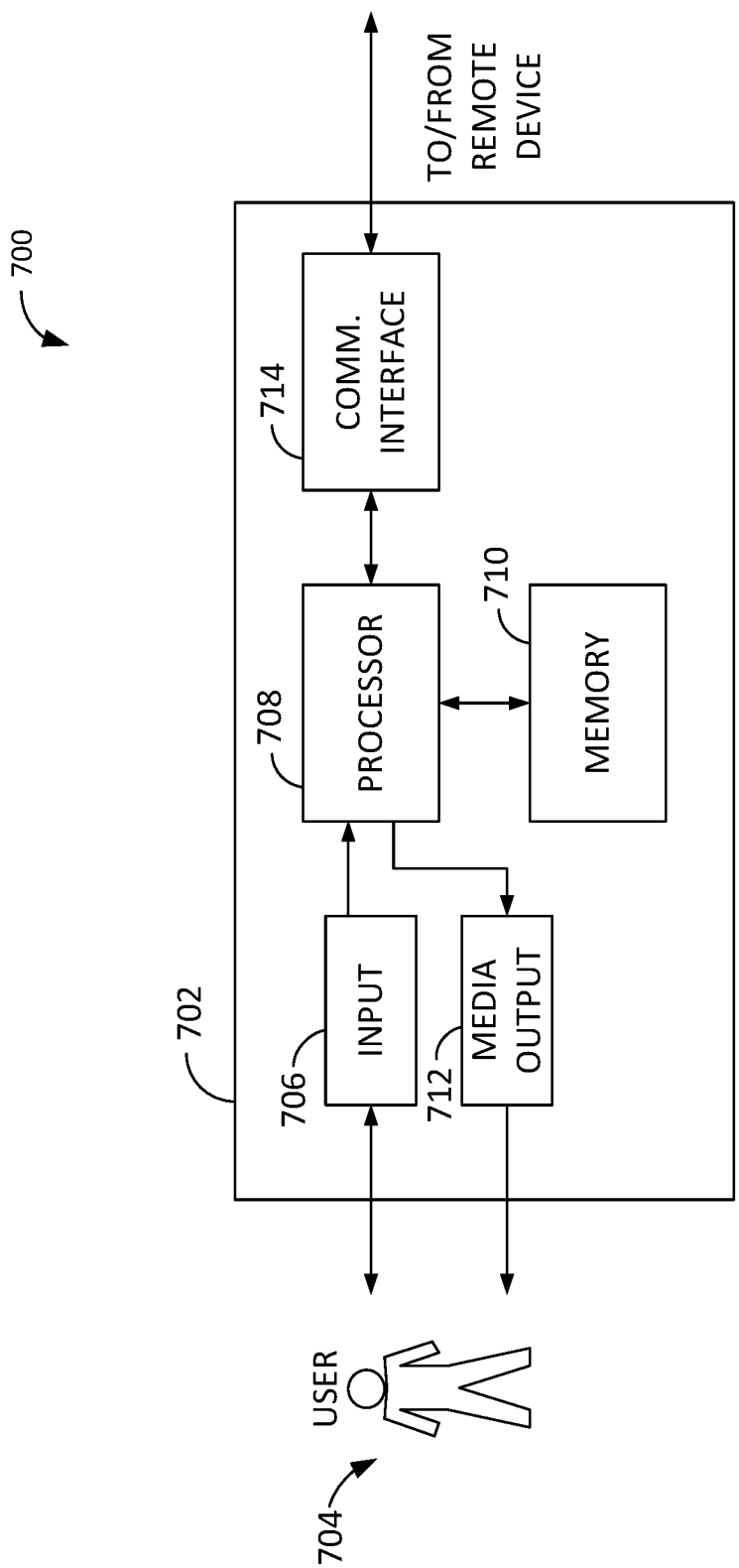

FIG. 7 illustrates an exemplary configuration 700 of an exemplary user computing device 702, such as user computing device 104 (shown in FIG. 1). In some embodiments, user computing device 702 is in communication with an automated deployment computing device, such as AD computing device 102 (shown in FIG. 1). User computing device 702 may be representative of, but is not limited to user computing device 104. For example, user computing device 702 may be a smartphone, tablet, smartwatch, wearable electronic, laptop, desktop, vehicle computing device, or another type of computing device associated with the account holder.

User computing device 702 may be operated by a user 704 (e.g., a user of matching system 100, shown in FIG. 1). User computing device 702 may receive input from user 704 via an input device 706. User computing device 702 includes a processor 708 for executing instructions. In some embodiments, executable instructions may be stored in a memory area 710. Processor 708 may include one or more processing units (e.g., in a multi-core configuration). Memory area 710 may be any device allowing information such as executable instructions and/or transaction data to be stored and retrieved. Memory area 710 may include one or more computer-readable media.

User computing device 702 also may include at least one media output component 712 for presenting information to user 704. Media output component 712 may be any component capable of conveying information to user 704. In some embodiments, media output component 712 may include an output adapter (not shown), such as a video adapter and/or an audio adapter. An output adapter may be operatively coupled to processor 708 and operatively coupleable to an output device, such as a display device (e.g., a cathode ray tube (CRT), liquid crystal display (LCD), light emitting diode (LED) display, or "electronic ink" display) or an audio output device (e.g., a speaker or headphones). In some embodiments, media output component 712 may be configured to present a graphical user interface (e.g., a web browser and/or a client application) to user 704.

In some embodiments, user computing device 702 may include input device 706 for receiving input from user 704. User 704 may use input device 706 to, without limitation, interact with AD computing system 100 (e.g., using an app), matching computing device 102, or any of automation server 106, deployment server 108, and/or third party applications server 110 (shown in FIG. 1). Input device 706 may include, for example, a keyboard, a pointing device, a mouse, a stylus, and/or a touch sensitive panel (e.g., a touch pad or a touch screen). A single component, such as a touch screen, may function as both an output device of media output component 712 and input device 706. User computing device 702 may further include at least one sensor, including, for example, an audio input device, a video input device, a gyroscope, an accelerometer, a position detector, a biometric input device, and/or a telematics data collection device. In some embodiments, at least some data collected by user computing device 702 may be transmitted to AD computing device 102.

User computing device 702 may also include a communication interface 714, communicatively coupled to any of matching computing device 102, automation server 106, deployment server 108, and/or third party applications server 110. Communication interface 714 may include, for example, a wired or wireless network adapter and/or a wireless data transceiver for use with a mobile telecommunications network.

Stored in memory area 710 may be, for example, computer-readable instructions for providing a user interface to user 704 via media output component 712 and, optionally, receiving and processing input from input device 706. The user interface may include, among other possibilities, a web browser and/or a client application. Web browsers enable users, such as user 704, to display and interact with media and other information typically embedded on a web page or a website hosted by AD computing device 102 and/or user computing device 702. A client application may allow user 704 to interact with, for example, any of matching computing device 102, insurance provider server 104, client devices 106, third party servers 108, and social media servers 110. For example, instructions may be stored by a cloud service and the output of the execution of the instructions sent to the media output component 712.

Figure 8:
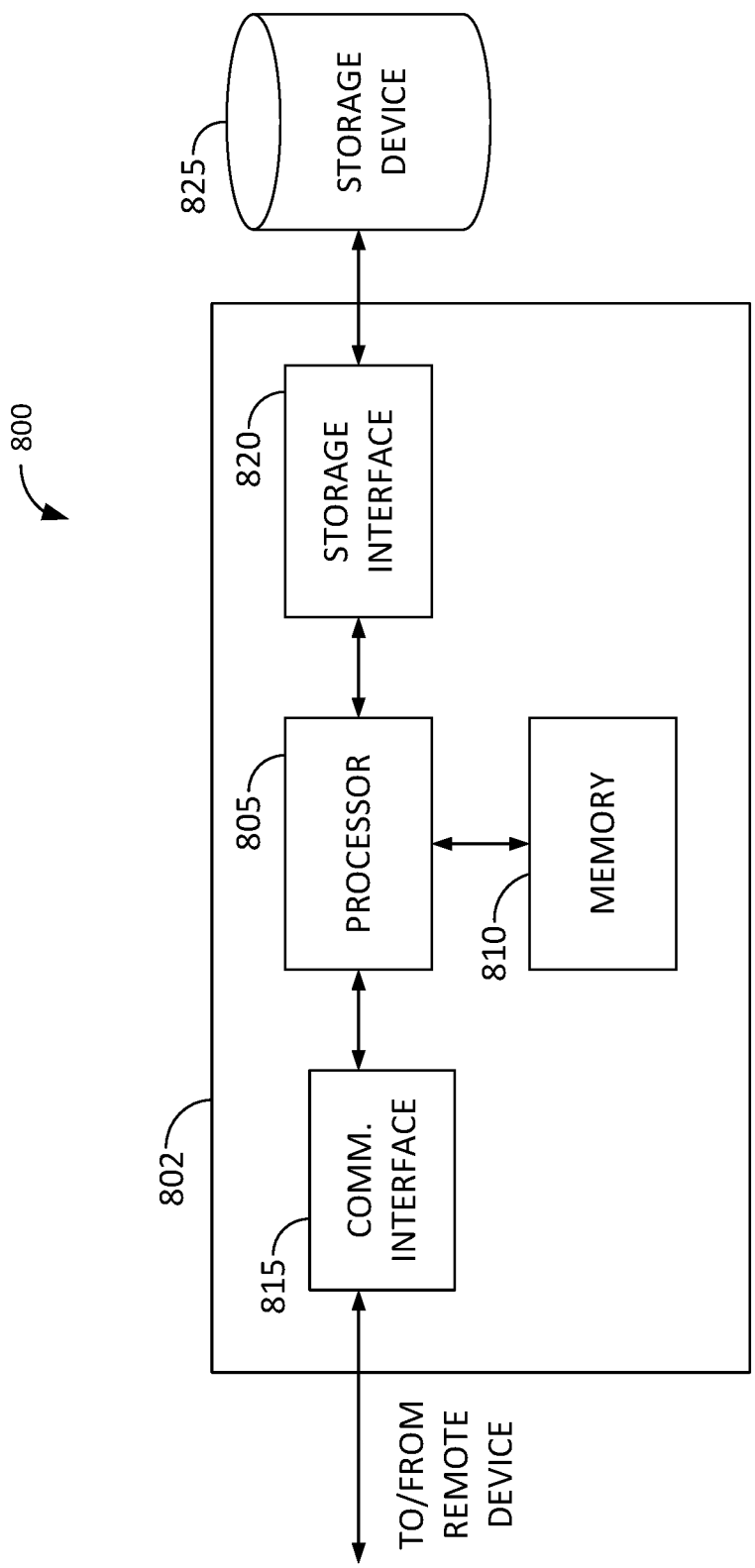

FIG. 8 depicts an exemplary configuration 800 of an exemplary server computing device 802, in accordance with one embodiment of the present disclosure. Server computer device 802 may include, but is not limited to, AD computing device 102 (shown in FIG. 1). Server computer device 802 may include a processor 805 for executing instructions. Instructions may be stored in a memory area 810. Processor 805 may include one or more processing units (e.g., in a multi-core configuration).

Processor 805 may be operatively coupled to a communication interface 815 such that server computer device 802 may be capable of communicating with a remote device such as another server computer device 802 or a user computing device, such as user computing device 702 (shown in FIG. 7). For example, communication interface 805 may receive requests from or transmit requests to user computing device 702 via the Internet.

Processor 805 may also be operatively coupled to a storage device 825. Storage device 825 may be any computer-operated hardware suitable for storing and/or retrieving data, such as, but not limited to, data associated with automation database 122 (shown in FIG. 1). In some embodiments, storage device 825 may be integrated in server computer device 802. For example, server computer device 802 may include one or more hard disk drives as storage device 825. In other embodiments, storage device 825 may be external to server computer device 802 and may be accessed by a plurality of server computer devices 802. For example, storage device 825 may include a storage area network (SAN), a network attached storage (NAS) system, and/or multiple storage units such as hard disks and/or solid state disks in a redundant array of inexpensive disks (RAID) configuration.

In some embodiments, processor 805 may be operatively coupled to storage device 825 via a storage interface 820. Storage interface 820 may be any component capable of providing processor 805 with access to storage device 825. Storage interface 820 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 805 with access to storage device 825.

Processor 805 executes computer-executable instructions for implementing aspects of the disclosure. In some embodiments, processor 805 may be transformed into a special purpose microprocessor by executing computer-executable instructions or by otherwise being programmed.

Figure 9:
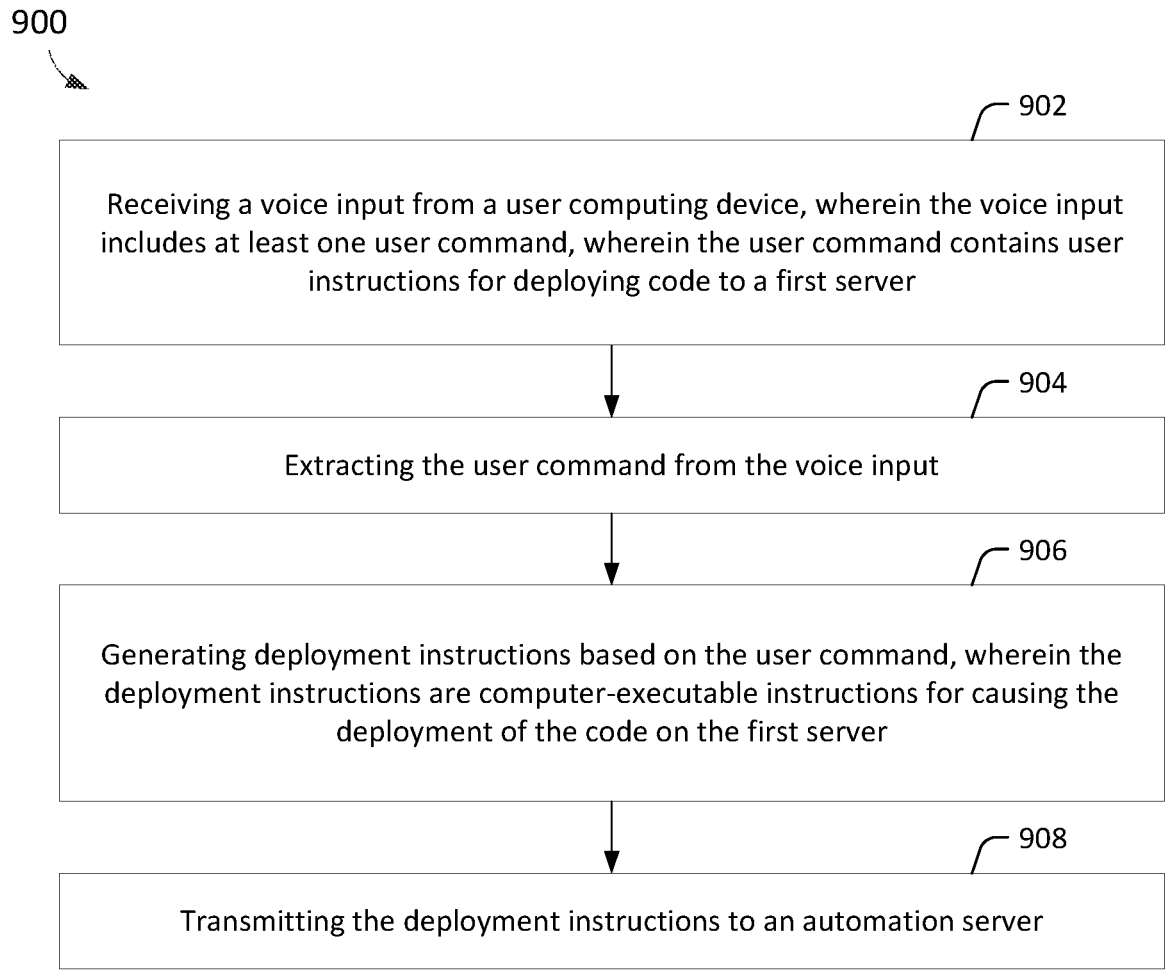

FIG. 9 depicts a flow chart illustrating a computer-implemented method 900 for automatically deploying code to a server. In the exemplary embodiment, method 900 may be implemented by an automated deployment computer system, such as automated deployment computer system 100 (shown in FIG. 1), and more specifically, by an automated deployment computing device, such as automated deployment device 102 (shown in FIG. 1).

Method 900 may include receiving 902 a voice input from a user computing device, wherein the voice input includes at least one user command, wherein the user command contains user instructions for deploying code to a first server. Method 900 may further include extracting 904 the user command from the voice input and generating 906 deployment instructions based on the user command, wherein the deployment instructions are computer-executable instructions for causing the deployment of the code on the first server. Method 900 may further include transmitting 908 the deployment instructions to an automation server.

Figure 10:
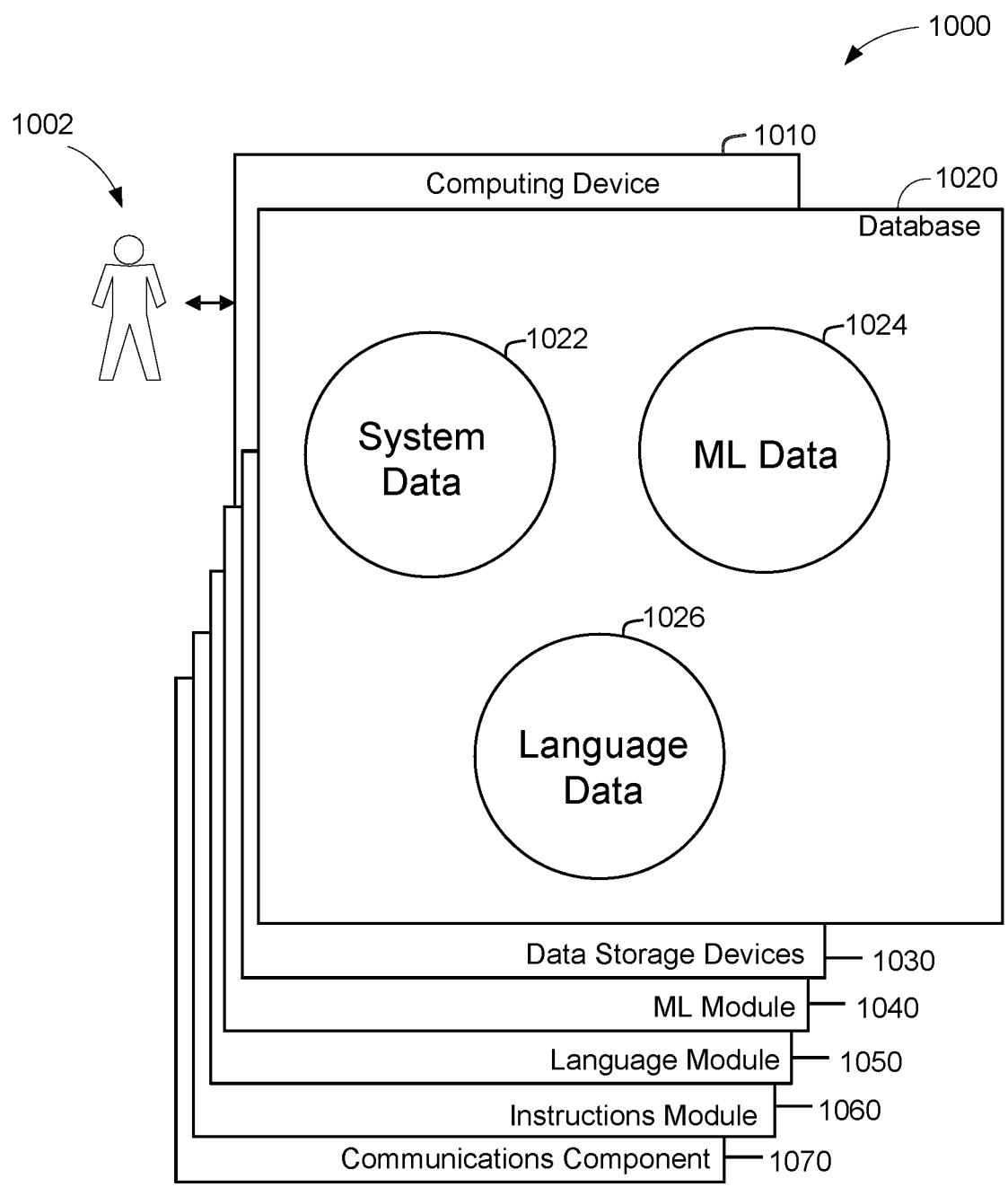

FIG. 10 depicts a diagram 1000 of components of one or more exemplary computing devices 1010 that may be used in an automated deployment computer system, such as automated deployment computer system 100 (shown in FIG. 1). In some embodiments, computing device 1010 may be similar to automated deployment computing device 102 (shown in FIG. 1). Database 1020 may be coupled with several separate components within computing device 1010, which perform specific tasks. In this embodiment, database 1020 may include user system data 1022, ML data 1024, and language data 1026. In some embodiments, database 1020 is similar to automation database 122 (shown in FIG. 1).

Computing device 1010 may include the database 1020, as well as data storage devices 1030, which may be used, for example, for storing data, such as system data 1022, ML data 1024, and language data 1026 locally. Computing device 1010 may also include ML module 1040, language module 1050, and instructions module 1060, which may be used in combination, for example, to receive 902 a voice input, extract 904 a user command from the voice input, and generate 906 deployment instructions based on the user command (all shown in FIG. 9). Additionally, computing device 1010 may include communications component 1070, which may be used to enable communication between any components of computing device 1010 as well as between computing device 1010 and external computing device. Communications component 1070 may be used, for example, to transmit 908 deployment instructions to an automation server (shown in FIG. 9).

As will be appreciated based on the foregoing specification, the above-described embodiments of the disclosure may be implemented using computer programming or engineering techniques including computer software, firmware, hardware or any combination or subset thereof, wherein the technical effect is to enable the use of transaction cards for bill payment within a consumer financial institution payment platform. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for deploying code to a server, the method implemented by a computer system including at least one processor, the method comprising:
    receiving a voice input from a user computing device, wherein the voice input includes at least one user command, wherein the user command contains user instructions for deploying code to a first server;
    extracting the user command from the voice input;
    generating deployment instructions based on the user command, wherein the deployment instructions are computer-executable instructions for causing the deployment of the code on the first server;
    transmitting the deployment instructions to an automation server;
    receiving application response data from the automation server, wherein the application response data includes server status data associated with the first server;
    in response to receiving the application response data, automatically generating revised computer-executable instructions for causing the deployment of the code to a second server by applying a trained decision model to the application response data, wherein the trained decision model is trained using (i) machine learning techniques and (ii) previous user response data, wherein the previous user response data include responses from the user to previous application response data; and
    transmitting the revised instructions to the automation server.

2. The computer-implemented method of claim 1, wherein the method further comprises:
    generating a notification requesting a response from a user;
    transmitting the notification to a user computing device;
    receiving a user response in the form of user response data from the user computing device; and
    generating the revised instructions causing the deployment of the code on the second server based on the application response data and user response data.

3. The computer-implemented method of claim 2, wherein the method further comprises:
    updating the trained decision model, using the machine learning techniques, based on the user response data.

4. The computer-implemented method of claim 1, wherein the method further comprises:
    generating third party application instructions based on the user command, wherein the third party application instructions are computer-executable instructions for causing some action within a third party software application; and
    transmitting the third party application instructions to a third party application server.

5. The computer-implemented method of claim 1, wherein the method further comprises:
  generating third party application instructions based on the application response data, wherein the third party application instructions are computer-executable instructions for causing some action within a third party software application; and
  transmitting the third party application instructions to a third party application server.

6. The computer-implemented method of claim 1, wherein:
  the automation server receives the deployment instructions; and
  the deployment instructions cause the automation server to deploy the code on the first server without further action by the user.

7. An automated deployment computer system for deploying code to a server, the automated deployment computer system including at least one processor in communication with at least one memory device, wherein the at least one processor is configured to:
  receive a voice input from a user computing device, wherein the voice input includes at least one user command, wherein the user command contains user instructions for deploying code to a first server;
  extract the user command from the voice input;
  generate deployment instructions based on the user command, wherein the deployment instructions are computer-executable instructions for causing the deployment of the code on the first server;
  transmit the deployment instructions to an automation server;
  receive application response data from the automation server, wherein the application response data includes server status data associated with the first server;
  in response to receiving the application response data, automatically generate revised computer-executable instructions for causing the deployment of the code to a second server by applying a trained decision model to the application response data, wherein the trained decision model is trained using (i) machine learning techniques and (ii) previous user response data, wherein the previous user response data includes responses from the user to previous application response data; and
  transmit the revised instructions to the automation server.

8. The automated deployment computer system of claim 7, wherein the processor is further configured to:
  generate a notification requesting a response from a user;
  transmit the notification to a user computing device;
  receive a user response in the form of user response data from the user computing device; and
  generate the revised instructions causing the deployment of the code on the second server based on the application response data and user response data.

9. The automated deployment computer system of claim 8, wherein the processor is further configured to:
  update the trained decision model, using the machine learning techniques, based on the user response data.

10. The automated deployment computer system of claim 7, wherein the processor is further configured to:
  generate third party application instructions based on the user command, wherein the third party application instructions are computer-executable instructions for causing some action within a third party software application; and
  transmit the third party application instructions to a third party application server.

11. The automated deployment computer system of claim 7, wherein the processor is further configured to:
  generate third party application instructions based on the application response data, wherein the third party application instructions are computer-executable instructions for causing some action within a third party software application; and
  transmit the third party application instructions to a third party application server.

12. The automated deployment computer system of claim 7, wherein:
  the automation server receives the deployment instructions; and
  the deployment instructions cause the automation server to deploy the code on the first server without further action by the user.

13. At least one non-transitory computer-readable storage media having computer-executable instructions embodied thereon for deploying code to a server, wherein when executed by at least one processor, the computer-executable instructions cause the processor to:
  receive a voice input from a user computing device, wherein the voice input includes at least one user command, wherein the user command contains user instructions for deploying code to a first server;
  extract the user command from the voice input;
  generate deployment instructions based on the user command, wherein the deployment instructions are computer-executable instructions for causing the deployment of the code on the first server;
  transmit the deployment instructions to an automation server;
  receive application response data from the automation server, wherein the application response data includes server status data associated with the first server;
  in response to receiving the application response data, automatically generate revised computer-executable instructions for causing the deployment of the code to a second server by applying a trained decision model to the application response data, wherein the trained decision model is trained using (i) machine learning techniques and (ii) previous user response data, wherein the previous user response data include responses from the user to previous application response data; and
  transmit the revised instructions to the automation server.

14. The computer-readable storage media of claim 13, wherein the computer-executable instructions further cause the processor to:
  generate a notification requesting a response from a user;
  transmit the notification to a user computing device;
  receive a user response in the form of user response data from the user computing device; and
  generate the revised instructions causing the deployment of the code on the second server based on the application response data and user response data.

15. The computer-readable storage media of claim 14, wherein the computer-executable instructions further cause the processor to:
  update the trained decision model, using the machine learning techniques, based on the user response data.

16. The computer-readable storage media of claim 13, wherein the computer-executable instructions further cause the processor to:
  generate third party application instructions based on the user command, wherein the third party application instructions are computer-executable instructions for causing some action within a third party software application; and transmit the third party application instructions to a third party application server.

17. The computer-readable storage media of claim 13, wherein the computer-executable instructions further cause the processor to:

receive, by the automation server, the deployment instructions; and cause, via the deployment instructions, the automation server to deploy the code on the first server without further action by the user.

* * * * *